US011113619B2

(12) United States Patent
Li et al.

(10) Patent No.: US 11,113,619 B2
(45) Date of Patent: Sep. 7, 2021

(54) DETERMINING ACTION SELECTION POLICIES OF AN EXECUTION DEVICE

(71) Applicant: ALIPAY (HANGZHOU) INFORMATION TECHNOLOGY CO., LTD., Zhejiang (CN)

(72) Inventors: Hui Li, Hangzhou (CN); Le Song, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/084,268

(22) Filed: Oct. 29, 2020

(65) Prior Publication Data

US 2021/0182719 A1    Jun. 17, 2021

Related U.S. Application Data

(63) Continuation of application No. PCT/CN2019/124945, filed on Dec. 12, 2019.

(51) Int. Cl.
*G07F 17/32* (2006.01)
*G06N 7/00* (2006.01)
(Continued)

(52) U.S. Cl.
CPC ......... *G06N 7/005* (2013.01); *G07F 17/3227* (2013.01); *G07F 17/3293* (2013.01);
(Continued)

(58) Field of Classification Search
CPC . G07F 17/3227; G07F 17/3293; G06N 7/005; G06Q 10/067; G06Q 50/28; G06Q 50/30
See application file for complete search history.

(56) References Cited

U.S. PATENT DOCUMENTS 10,678,125 B2    6/2020  Li et al.
10,769,544 B2    9/2020  Li et al.
(Continued)

FOREIGN PATENT DOCUMENTS

CN    106296006    1/2017
CN    108108822    6/2018
(Continued)

OTHER PUBLICATIONS

U.S. Appl. No. 17/084,241, Hui et al., filed Oct. 29, 2020.
(Continued)

*Primary Examiner* — Omkar A Deodhar
*Assistant Examiner* — Shauna-Kay Hall
(74) *Attorney, Agent, or Firm* — Fish & Richardson P.C.

(57) ABSTRACT

Disclosed herein are methods, systems, and apparatus, including computer programs encoded on computer storage media, for generating an action selection policy for completing a task in an environment. The method includes identifying multiple possible actions in a state, wherein the state corresponds to a vector of information sets; identifying a vector of current action selection policies in the state, wherein each current action selection policy in the vector of current action selection policies corresponds to an information set in the vector of information sets; computing a sampling policy based on the vector of current action selection policies in the state; sampling an action among the multiple possible actions in the state according to a sampling probability of the action specified in the sampling policy; and updating each current action selection policy of the execution device in the state based on the action.

20 Claims, 14 Drawing Sheets

Game Tree

(51) Int. Cl.
*G06Q 30/06* (2012.01)
*G06Q 50/28* (2012.01)
*G06Q 10/06* (2012.01)
*G06Q 50/30* (2012.01)

(52) U.S. Cl.
CPC ....... *G06Q 10/067* (2013.01); *G06Q 30/0631* (2013.01); *G06Q 50/28* (2013.01); *G06Q 50/30* (2013.01)

(56) References Cited

U.S. PATENT DOCUMENTS

| | | | |
|---|---|---|---|
| 2008/0222065 A1* | 9/2008 | Kedrowski | G06N 3/08 706/19 |
| 2012/0158488 A1 | 6/2012 | Bottou et al. | |
| 2013/0185039 A1 | 7/2013 | Tesauro et al. | |
| 2014/0039913 A1 | 2/2014 | Sandholm | |
| 2017/0257452 A1 | 9/2017 | Hoiles et al. | |
| 2018/0098330 A1 | 4/2018 | Nguyen et al. | |
| 2018/0349783 A1 | 12/2018 | Pouyllau | |
| 2018/0357554 A1 | 12/2018 | Hazan et al. | |
| 2019/0156197 A1 | 5/2019 | Dasgupta | |
| 2019/0354869 A1 | 11/2019 | Warde-Farley et al. | |

FOREIGN PATENT DOCUMENTS

| | | |
|---|---|---|
| CN | 108985458 | 12/2018 |
| CN | 110222874 | 9/2019 |
| CN | 110404265 | 11/2019 |
| WO | WO 2013137939 | 9/2013 |
| WO | WO 2020143847 | 7/2020 |
| WO | WO 2020143848 | 7/2020 |

OTHER PUBLICATIONS

U.S. Appl. No. 17/084,363, Hui et al., filed Oct. 29, 2020.
Brown et al., "Deep counterfactual regret minimization," arXiv preprint arXiv:1811.00164, Nov. 13, 2018, pp. 1-12.
Chen et al., "Utilizing History Information in Acquiring Strategies for Board Game Geister by Deep Counterfactual Regret Minimization," The 24th Game Programming Workshop, 2019, pp. 20-27.
Crosby et al., "BlockChain Technology: Beyond Bitcoin," Sutardja Center for Entrepreneurship & Technology Technical Report, Oct. 16, 2015, 35 pages.
Davis et al "Low-Variance and Zero-Variance Baselines for Extensive-Form Games," arXiv:1907.09633v1, Jul. 2019, 21 pages.
Deepstack.ai [online], "Expert-Level Artificial Intelligence in Heads-Up No-Limit Poker," retrieved on Nov. 11, 2020, retrieved from URL<https://www.deepstack.ai/>, 9 pages.
European Search Report in European Application No. 19789849.7 dated Jan. 8, 2020, 8 pages.
Gibson et al., ""Efficient Monte Carlo Counterfactual Regret Minimization in Games with Many Player Actions,"" Advances in Neural Information Processing Systems, Dec. 2012, 9 pages.
Hu et al., "Online Counterfactual Regret Minimization in Repeated Imperfect Information Extensive Games," Journal of Computer Research and Development, 2014, 51(10): 2160-2170 (with English Abstract).
Johanson et al., "Accelerating Best Response Calculation in Large Extensive Games," Proceedings of the 22nd International Joint Conference on Artificial Intelligence, Jul. 2011, 8 pages.
Johanson et al., "Efficient Nash Equilibrium Approximation through Monte Carlo Counterfacutal Regret Minimization," Conference: Autonomous Agents and Multiagent Systems, May 2012, 8 pages.
Lanctor et al., "Monte Carlo Sampling for Regret Minimization in Extensive Games," Proceedings of the 22nd International Conference on Newral Information Processing Systems, Dec. 2009, 9 pages.
Li et al., "Double Neural Counterfactual Regret Minimization," Georgia Institute of Technology, 2018, pp. 1-20.
Lisy et al, "Online Monte Carlo Counterfactual Regret Minimization for Search in Imperfect Information Games," International Conference on Autonomous Agents and Multiagent Systems, May 2015, pp. 27-36.
Liu et al., "A Game Theoretic Approach for Attack Prediction," Department of Information Systems, UMBC, 2002, 20 pages.
Moravcik et al., "DeepStack: Expert-Level Artificial Intelligence in No-Limit Poker," Science, May 2017, 356(6337):1-15.
Nakamoto, "Bitcoin: A Peer-to-Peer Electronic Cash System," www.bitcoin.org, 2005, 9 pages.
Neller et al., "Approximating Optimal Dudo Play with Fixed-Strategy Iteration Counterfacutal Regret Minimization," Advances in Computer Games: 13th International Conference, Jan. 2012, 14 pages.
PCT International Search Report and Written Opinion in International Application No. PCT/CN2019/072204, dated Oct. 15, 2019, 7 pages.
PCT International Search Report and Written Opinion in International Application No. PCT/CN2019/124933, dated Sep. 16, 2020, 7 pages.
PCT International Search Report and Written Opinion in International Application No. PCT/CN2019/124942, dated Sep. 17, 2020, 7 pages.
PCT International Search Report and Written Opinion in International Application No. PCT/CN2019/124945, dated Sep. 23, 2020, 7 pages.
Schmid et al., "Variance Reduction in Monte Carlo Counterfactual Regret Minimization (VR-MCCFR_ for Extensive Form Games using Baselines," arXiv:1809.03057v1, Sep. 2018, 13 pages.
Teng, "Research on Texas Poker Game Based on Counterfactual Regret Minimization Algorithm," China Masters' Theses Full-text Database, Dec. 2015, 65 pages (with English Abstract).
Wikipedia.org [online], "Libratus," Mar. 6, 2017, retrieved on Feb. 29, 2020, retrieved from URL<https://en.wikipedia.org/wiki/Libratus>, 4 pages.
Zheng et al., "Clustering routing algorithm of wireless sensor networks based on Bayesian game," Journal of Systems Engineering and Electronics, 2012, 23(1):154-159.
Zhou et al., "Lazy-CFR: a fast regret minimization algorithm for extensive games with Imperfect Information," Cornell University, 2018, arXiv:1810.04433v2, 10 pages.
Zinkevich et al., "Regret Minimization in Games with Incomplete Information," Neural Information Processing Systems, 2007, 14 pages.

* cited by examiner

DETERMINING ACTION SELECTION POLICIES OF AN EXECUTION DEVICE

CROSS-REFERENCE TO RELATED APPLICATIONS

This application is a continuation of PCT Application No. PCT/CN2019/124945, filed on Dec. 12, 2019, which is hereby incorporated by reference in its entirety.

TECHNICAL FIELD

This specification relates to determining action selection policies for an execution device for completing a task in an environment that includes the execution device and one or more other devices.

BACKGROUND

Strategic interaction between two or more parties can be modeled and simulated by a game that involves two or more parties (also referred to as players). In Imperfect Information Games (IIG) that involve two or more players, a player only has partial access to the knowledge of her opponents before making a decision. This is similar to real-world scenarios, such as trading, traffic routing, and public auction. Many real life scenarios can be represented as IIGs, such as commercial competition between different companies, bidding relationships in auction scenarios, and game relationships between a fraud party and an anti-fraud party.

Due to the hidden information, a player has to make decisions with uncertainty about her opponents' information, and she also needs to act so as to take advantage of her opponents' uncertainty about her own information. Solving an IIG can be computationally expensive and time consuming, especially for large games that has a large number of possible states and possible actions to choose. Techniques for solving an IIG in an efficient manner are desirable.

SUMMARY

Described embodiments of the subject matter can include one or more features, alone or in combination.

For example, in one embodiment, a computer-implemented method of an execution device for generating an action selection policy for completing a task in an environment that includes the execution device and one or more other devices, the method comprising: identifying a plurality of possible actions in a state, wherein the state corresponds to a vector of information sets, and each information set in the vector of information sets comprises a sequence of actions taken by the execution device that leads to the state; identifying a vector of current action selection policies in the state, wherein each current action selection policy in the vector of current action selection policies corresponds to an information set in the vector of information sets, and the action selection policy specifies a respective probability of selecting an action among the plurality of possible actions in the state; computing a sampling policy based on the vector of current action selection policies in the state, wherein the sampling policy specifies a respective sampling probability corresponding to each of the plurality of possible actions in the state; sampling an action among the plurality of possible actions in the state according to a sampling probability of the action specified in the sampling policy; and updating the each current action selection policy in the vector of current action selection policies of the execution device in the state based on the action.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, in response to determining that a convergence condition is met, operations of the execution device are controlled based on the action selection policy.

In some embodiments, updating the each current action selection policy in the vector of current action selection policies of the execution device in the state based on the action comprises performing Monte Carlo counterfactual regret minimization (MCCFR) based on the action.

In some embodiments, updating the each current action selection policy in the vector of current action selection policies of the execution device in the state based on the action comprises: calculating a probability of a sampled terminal sequence of actions based on the sampling probability of the action, the sampled terminal sequence of actions including the action and a terminal state for completing a task; calculating a sampled counterfactual value of the action based on the probability of the sampled terminal sequence of actions; calculating a regret value of the action based on the sampled counterfactual value of the action; and updating the each of the vector of current action selection policies of the execution device in the state based on the regret value of the action.

In some embodiments, the state corresponds to a public sequence that comprises one or more actions publically known by the execution device and the one or more other devices; and the each information set in the vector of information sets comprises the public sequence.

In some embodiments, computing a sampling policy based on the vector of current action selection policies of the execution device in the state comprises: computing the sampling probability corresponding to each of the plurality of possible actions in the state as a mean value of current action selection policies of each of the plurality of possible actions in the state over the vector of information sets.

In some embodiments, computing a sampling policy based on the vector of current action selection policies of the execution device in the state comprises: computing the sampling probability corresponding to each of the plurality of possible actions in the state based on current action selection policies of each of the plurality of possible actions in the state and respective reach probabilities of the vector of information sets.

In some embodiments, computing the sampling probability corresponding to each of the plurality of possible actions in the state based on current action selection policies of each of the plurality of possible actions in the state and respective reach probabilities of the vector of information sets comprises: computing the sampling probability corresponding to each of the plurality of possible actions in the state based on a sum of the current action selection policies of each of the plurality of possible actions in the state weighted by the respective reach probabilities of the vector of information sets.

In some embodiments, computing a sampling policy based on the vector of current action selection policies of the execution device in the state comprises: computing the sampling probability corresponding to each of the plurality of possible actions in the state based on average action selection policies of each of the plurality of possible actions in the state and respective reach probabilities of the vector of information sets.

In some embodiments, computing the sampling probability corresponding to each of the plurality of possible actions in the state based on average action selection policies of each of the plurality of possible actions in the state and respective reach probabilities of the vector of information sets comprises: computing the sampling probability corresponding to each of the plurality of possible actions in the state based on a sum of the average action selection policies of each of the plurality of possible actions in the state weighted by the respective reach probabilities of the vector of information sets.

It is appreciated that methods in accordance with this specification may include any combination of the aspects and features described herein. That is, methods in accordance with this specification are not limited to the combinations of aspects and features specifically described herein but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
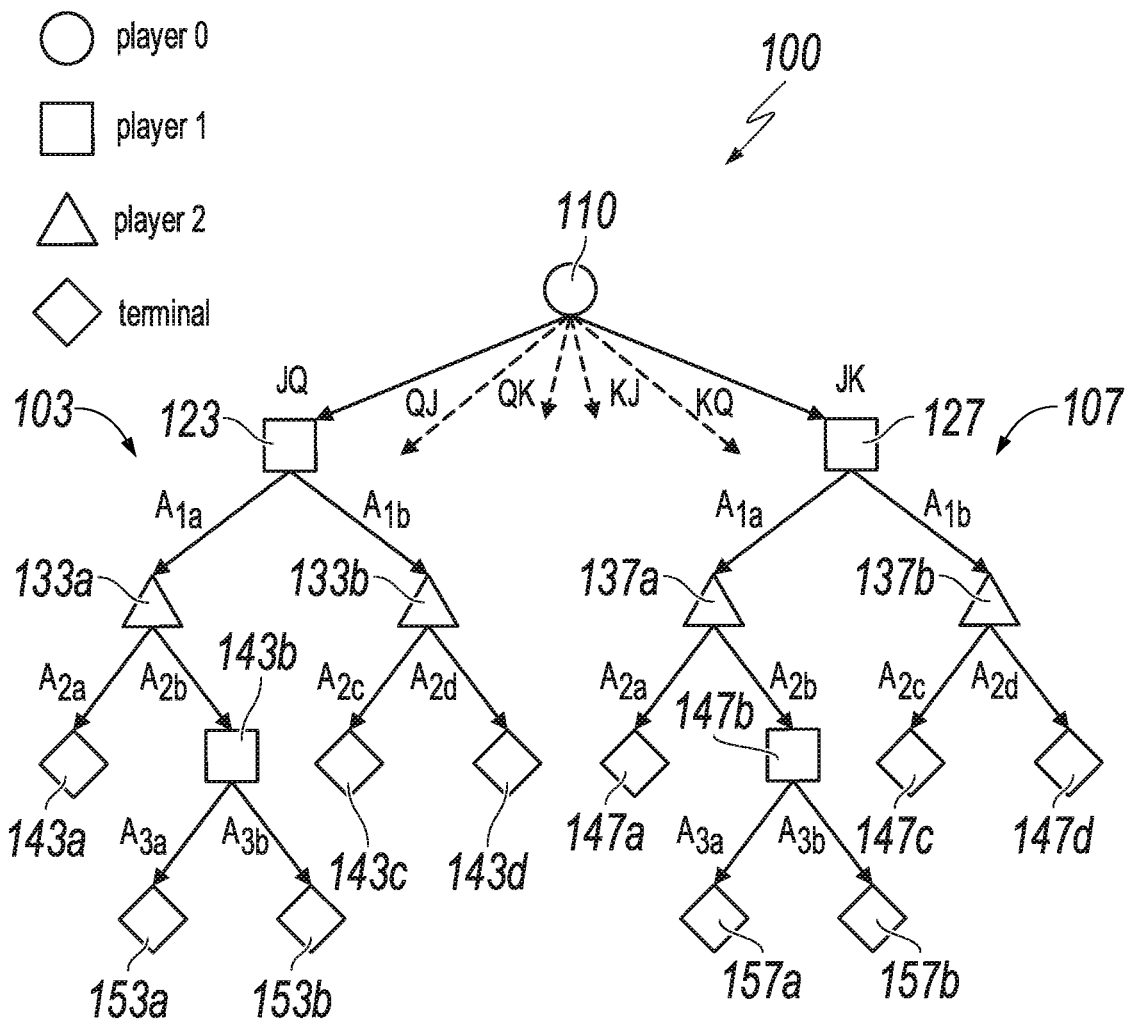
FIGS. 1A and 1B are diagrams illustrating examples of a game tree and a public tree of Kuhn Poker in accordance with embodiments of this specification.

This specification describes techniques for determining an action selection policy for an execution device for completing a task in an environment that includes the execution device and one or more other devices, for example, for strategic interaction between the execution device and the one or more other devices. For example, the execution device can perform a computer-implemented method for searching for a Nash equilibrium of a game between the execution device and one or more other devices, and obtain an action selection policy (e.g., a solution or strategy) that leads to Nash equilibrium or approximate Nash equilibrium. In some embodiments, these techniques can involve performing a counterfactual regret minimization (CFR) algorithm for solving an imperfect information game (IIG). In some embodiments, the techniques can reduce the computational complexity and variance while improving the convergence speed of the CFR algorithm.

An IIG can represent one or more real-world scenarios such as autonomous vehicle (AV) control, resource allocation, product/service recommendation, cyber-attack prediction and/or prevention, traffic routing, fraud management, trading, bidding, etc. that involve two or more parties (also referred to as players) where each party may have incomplete or imperfect information about another party's decisions. This specification uses Poker as an example of an IIG. The described techniques can be used in many other artificial intelligence (AI) and machine learning applications.

The typical target of solving an IIG is to find a Nash equilibrium so that no player can unilaterally improve the reward. In other words, a Nash equilibrium is a typical solution for an IIG that involves two or more players. Counterfactual Regret Minimization (CFR) is an algorithm designed to approximately find Nash equilibriums for large games. CFR tries to minimize overall counterfactual regret. It is proven that the average of the strategies in all iterations would converge to a Nash equilibrium. When solving a game, CFR in its original form (also referred to as original CFR, standard CFR, vanilla CFR, or simply, CFR) traverses the entire game tree in each iteration. Thus, the original CFR requires large memory for large, zero-sum extensive games such as heads-up no-limit Texas Hold'em. In some instances, the original CFR may not handle large games with limited memory.

A Monte Carlo CFR (MCCFR) was introduced to minimize counterfactual regret. MCCFR can solve imperfect information games from sampled experiences. Different from the original CFR, MCCFR samples a subset of nodes in a game tree in each iteration. The MCCFR can compute an unbiased estimation of counterfactual value and avoid traversing the entire game tree. Since only subsets of all information sets are visited in each iteration, MCCFR requires less memory than the original CFR. MCCFR can include different versions or variants, for example, depending on different sampling polices. MCCFR typically has poor long-term performance and high variance due to the sampling.

This specification describes example techniques to accelerate the convergence of MCCFR. For example, the techniques include a vector-form sampling policy, a variance reduction method with a provable unbiased estimate, an exploration technique, and a hybrid MCCFR variants with skipping mechanism and discounting updates. These one or more techniques can be combined together and applied to MCCFR. The experiment results showed that the described techniques can bring about 100×~1000× speedup in many settings for MCCFR.

The techniques described in this specification can generate one or more technical advantages. In some embodiments, the described techniques can be performed by an execution device for generating an action selection policy for completing a task in an environment that includes the execution device and one or more other devices. In some embodiments, the described techniques can determine an action selection policy for a software-implemented application that performs actions in an environment that includes an execution party supported by the application and one or more other parties. In some embodiments, the described techniques can be used in automatic control, autonomous vehicle control, robotics, or any other application that involves action selections. For example, the determined action selection policy can be used to control engines, motors, actuators, valves, and any other equipment or be applied in a control circuit for controlling operations of one or more devices. In one example, a control system of an autonomous vehicle can be adapted to control the speed, acceleration, direction, and/or travel time of the autonomous vehicle, given prediction of movements of other vehicles in the environment. The control system can help the autonomous vehicle to reach a desired destination with better route selection, reduced travel time, and/or lower fuel consumption. This may facilitate, for example, traffic planning, accident avoidance, and increased operational safety.

As an example of an application in autonomous vehicles, the environment can include multiple autonomous vehicles for completing a task such as traffic planning or control to avoid collision and reach respective destinations of the multiple autonomous vehicles. Each of the multiple autonomous vehicles can be equipped with an execution device that can implement software-implemented applications for generating an action selection policy for completing the task in the environment. The generated action selection policy includes control information configured to control one or more of an engine, motor, actuator, brake, etc. of the autonomous vehicle. It can, thus, be used by each of the multiple autonomous vehicles to control one or more engine, motor, actuator, brake, etc. of the autonomous vehicle so that the autonomous vehicle can follow the generated action selection policy to achieve the task. In some embodiments, the task can be modelled by an IIG and the action selection policy to achieve the task can be generated by computer simulation, for example, by solving the IIG. Each of the multiple autonomous vehicles can represent a party of the IIG. The actions can include, for example, one or more of a specified direction, speed, distance, timing, or any other metrics of the autonomous vehicle. The action selection policy of the autonomous vehicle can include a strategy of selecting respective actions at different states (e.g., different intersections in a geographic location) so that the autonomous vehicle can navigate through the environment and reach the destination.

As another example of an application in robotics, the environment can include an industrial robot (e.g., a warehouse robot) that interacts with one or more other parties (e.g., other robots) in order to complete a task (e.g., to move items in the warehouse or to assemble some product). In some embodiments, the task can be modelled by an IIG and the action selection policy to achieve the task can be generated by computer simulation, for example, by solving the IIG. The action can include, for example, one or more of a specified direction, location, speed, or any other motions of the industrial robot. The action selection policy of the industrial robot can include a strategy of selecting respective actions at different states (e.g., different locations in a warehouse) so that the industrial robot can navigate through the environment and complete the task (e.g., moving the items in the warehouse).

In some embodiments, the described techniques can help find better strategies of real-world scenarios such as resource allocation, product/service recommendation, cyber-attack prediction and/or prevention, traffic routing, fraud management, etc. that can be modeled or represented by strategic interaction between parties, such as, an IIG that involves two or more parties. In some embodiments, the described techniques can leverage advanced sampling schemes (e.g., with consideration of vectors of current strategies and/or with exploration), which return strategies having smaller variances, closer to global rather than local optimal solution, or closer to Nash equilibrium.

In some embodiments, the described techniques can help find strategies of real-world scenarios in a more efficient manner. Accordingly, solutions or strategies of real-world scenarios can be found with a less amount of computer simulation and/or within reduced latency/response time. For example, compared to original CFR, the described techniques are based on MCCFR that only sample some of all possible combinations of actions of the players of the IIG, which significantly reduces computational loads for traversing or exhausting all possible combinations of actions for simulating and solving the IIG. In some embodiments, the solutions or strategies can be found within a significantly shorter response time, helping make possible certain real-world scenarios that require real-time or near real-time response or control.

In some embodiments, the described techniques can improve the convergence speed, improve computational efficiency, and reduce the computational load of the MCCFR algorithm in finding Nash equilibrium for solving a game that represents one or more real-world scenarios. In some embodiments, the described techniques can reduce variances of the MCCFR algorithm.

In some embodiments, the described vector-form sampling policies can provide more efficient sampling policies when the MCCFR is implemented in a vector form. The described vector-form sampling policies can take into account multiple different strategies at a decision point and compute a sampling policy that pay more attention to the relatively important actions, while achieving better long-term performances of finding the Nash equilibrium (including approximated Nash equilibrium), for example, by improving the convergence speed of performing MCCFR.

In some embodiments, the described variance reduction technique can reduce the variance and reduce the number of iterations of MCCFR. In some embodiments, the described variance reduction technique can reduce the computational load and improve the computational efficiency by using a control variate algorithm based on a counterfactual value baseline, rather than based on an expected utility value baseline.

In some embodiments, the described hybrid MCCFR algorithm with a skipping mechanism and discounting updates can accelerate the convergence and reduce variance of MCCFR compared to state-of-the-art methods.

In some embodiments, an extensive-form IIG can be represented as follows. There are n players (except for chance) in the IIG. $N=\{1, \ldots, n\}$ is a finite set of the players and each member refers to a player. In a two-player game, $N=\{1,2\}$. These two players are denoted by p1 and p2. The hidden information (variable) of player i is unobserved by the opponents, which is denoted by $h''_i$. Each member $h \in H$ refers to a possible history (or state). The history (or state) can include a sequence of actions (including actions of the chance) that lead to the state.

For player refers to all the players' hidden information except for the player i. The empty sequence $\emptyset$ is a member of H. $h_j \sqsubseteq h$ denotes $h_j$ is a prefix of h. Z denotes the set of terminal histories and any member $z \in Z$ is not a prefix of any other sequences. A terminal history can also be referred to as a terminal state, which can be an end state of the IIG. No further actions needs to be taken by any player in a terminal history. Each terminal history $z \in Z$ has an associated utility or payoff for each player i.

A player function P assigns a member of $N \cup \{c\}$ to each non-terminal history, where c refers to the chance player. P(h) is the player who takes actions at h. $A(h)=\{a:ha \in H\}$ is the set of available actions after $h \in H \backslash Z$. A non-terminal history can also be referred to as a non-terminal state, which can be intermediate state of the IIG. One or more players can have possible actions at a non-terminal state that leads to another state.

$I_i$ of a history $\{h \in H:P(h)=i\}$ is an information partition of player i. A set $I_i \in \mathcal{I}_i$ is an information set (infoset) of player i and $I_i(h)$ refers to infoset $I_i$ at state h. For $I_i \in \mathcal{I}_i$, we have $A(I_i)=A(h)$ and $P(I_i)=P(h)$. If all players in one game can recall their previous actions and infosets, it is referred to as a perfect-recall game.

Given all players' histories, a prefix tree (trie) can be built recursively. Such a prefix tree is called a game tree in game theory. Each node in the game tree refers to a history h. The infoset tree for each player is built on infosets rather than histories. A public tree is a prefix tree built on public sequences. Each of the public sequences can include actions that are publically known or observable by all players or even by a third-party observer. In some embodiments, a terminal history or a terminal state can be represented by a terminal node or a leaf node of the game tree or public tree. A non-terminal history or a non-terminal state can be represented by a non-terminal node of the game tree or public tree. A terminal history z corresponds to a sequence of actions (also referred to as a terminal sequence of actions) that include actions taken by all players that results in the terminal history z. For example, a terminal history z corresponds to a sequence of actions along a trajectory or path from the root node to the terminal node z of the game tree or public tree that includes actions taken by all players that results in the terminal history z.

FIGS. 1A and 2B are diagrams illustrating examples of a game tree 100 and a public tree 150 of Kuhn Poker in accordance with embodiments of this specification. Kuhn Poker is an example of a zero-sum two-player IIG of poker. Kuhn Poker is an example of an extensive-form game. The game rules are defined as follows. The deck includes only three playing cards, for example, a King (K), Queen (Q), and Jack (J). One card is dealt to each player, which may place bets similarly to a standard poker game. If both players bet or both players pass, the player with the higher card wins, otherwise, the betting player wins.

A game tree is a directed graph. The nodes of the game tree represent positions (or states of a player) in a game. As shown in FIG. 1A, the root node 110 of the game tree 100 is represented by a circle, which is a chance node (also referred to as player 0). Each terminal node or leaf node (e.g., a terminal node 143a, 153a, 153b, 143c, 143d, 147a, 157a, 157b, 147c, or 147d) of the game tree 100 is represented by a diamond, indicating a terminal state which shows a payoff of the one or two players in the game. Each square (e.g., a non-terminal node 123, 127, 143b, or 147b) represents a state of player 1. Each triangle (e.g., a non-terminal node 133a, 133b, 137a, or 137b) represents a state of player 2. In some embodiments, $h_i$ represents a non-terminal node and $z_i$ represents a terminal node.

After each player is dealt with a card, there are six different possible states. As shown by six arrows out of the root node 110, six different possible states are [J, Q], [J, K], [Q, J], [Q, K], [K, J], [K, Q], indicating the card received by player 1 and player 2, respectively. The game tree 100 shows subtrees 103 and 107 of two of the six possible states. The left subtree 103 corresponding to a state [J, Q] indicates that the two players (player 1 and player 2) are dealt with J and Q, respectively. The right subtree 107 corresponding to a state [J, K] indicates that the two players (player 1 and player 2) are dealt with J and K, respectively.

Arrows out of the node (or edges) of the game tree can represent possible actions of a player at the state of the game. As shown in FIG. 1A, the arrows out of the node 123 represent possible actions $A_{1a}$ and $A_{1b}$ of the player 1 at the state of the node 123 corresponding to the state [J, Q]. Similarly, arrows out of the node 133a represent possible actions $A_{2a}$ and $A_{2b}$ of the player 2 at the state of the node 133a corresponding to a state of [J, Q, $A_{1a}$], where the player 1 chooses. Arrows out of the node 133b represent possible actions $A_{2c}$ and $A_{2c}$ of the player 2 at the state of the node 133b corresponding to a state of [J, Q, $A_{1b}$].

The trajectory from the root node 110 to each node is a sequence or history of actions. For example, as illustrated in the subtree 103, the non-terminal node 143b corresponds to a sequence or history of actions (can be denoted as $h_{143b}$) including actions [J, Q, $A_{1a}$, $A_{2b}$]. The terminal node 153b corresponds to a sequence or history of actions (can be denoted as $h_{153b}$) including actions [J, Q, $A_{1a}$, $A_{2b}$, $A_{3b}$]. Since the node 153b is a terminal node, the sequence of actions [J, Q, $A_{1a}$, $A_{2b}$, $A_{3b}$] can be referred to as a terminal sequence of action (that leads to or results in the terminal state 153b. In the subtree 103, the node 143b is a prefix of the terminal node 153b. Similarly, the terminal node 143c corresponds to a sequence or history of actions (can be denoted as $h_{143c}$) including actions [J, Q, $A_{1b}$, $A_{2c}$].

In the IIG, the private card of player 1 is invisible to player 2. Similarly, the private card of player 2 is invisible to player 1. Therefore, the information available to player 1 at node 123 corresponding to the state [J, Q] and the node 127 corresponding to the state [J, K] are actually the same because player 1 only knows his private card J and does not know whether the opponent's, player 2's, private card is Q or K. An information set $I_i$ can be used to denote the set of these undistinguished states. Let $h_{123}$ denote the state of node 123 and $I_1(h_{123})$ denote the information set at the state of node 123, and $h_{127}$ denote the state of node 127 and $I_1(h_{127})$ denote the information set at the state of node 127. In this example, $I_1(h_{123})=I_1(h_{127})$. Typically, any $I_i \in I$ includes the information observed by player i including player is hidden variables (e.g., private cards) and public actions. In this example, $I_1(h_{123})=I_1(h_{127})=J$, which can be denoted as $I_{11}$.

Similarly, the information available to player 1 at node corresponding to states [Q, J] and [Q, K] are the same, which can be represented by the same information set $I_{12}$ that includes player 1's private card Q. The information available to player 1 at node corresponding to states [K, J] and [K, Q] are the same, which can be represented by the same information set $I_{13}$ that includes player 1's private card K.

Figure 1B:
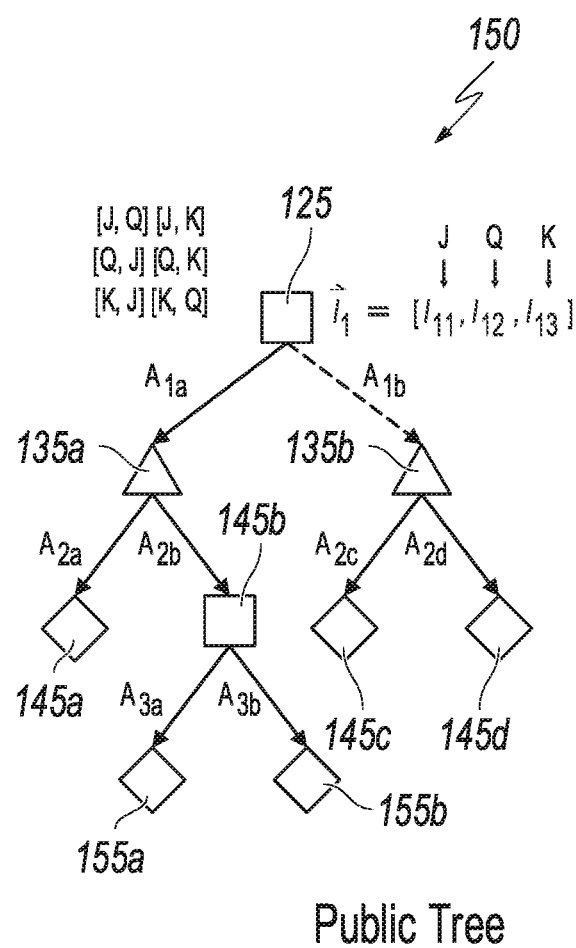

FIG. 1B shows the public tree 150 corresponding to the game tree 100. Each node 125, 135a, 135b, 145a, 145b, 145c, 145d, 155a, or 155b in public tree 150 can represent a public state that includes a sequence or history of public actions (also referred to as a public sequence). Each node corresponds to a vector of infosets $\vec{I}_v=[I_{v1}, I_{v2}, I_{v3}, \ldots]$. For $\forall I_{ij}, I_{jk} \in I_v$, they can indicate the same public sequence. $|I_j|$ refers to the length of the vector. For example, as shown in FIG. 1B, the node 125 corresponds to an initial public sequence, which is empty ∅ in this example. The node 125 is associated with a vector of infosets of player 1, $\vec{I}_1=[I_{11}, I_{12}, I_{13}]$, corresponding to player 1's private card of J, Q, K, respectively.

As another example, the node 135a can represent a public sequence that includes player 1's action $[A_{1a}]$ and corresponds to a vector of infosets of player 2. Similarly, node 135b can represent a public sequence that includes player 1's action $[A_{1b}]$, and corresponds to another vector of infosets of player 2. The non-terminal node 145b corresponds to a public sequence that includes public actions $[A_{1a}, A_{2b}]$. The terminal node 155b corresponds to a public sequence that includes public actions $[A_{1a}, A_{2b}, A_{3b}]$.

In some embodiments, the non-terminal node 145b in the public tree 150 can represent the common public state among six different possible initial states of [J, Q], [J, K], [Q, J], [Q, K], [K, J], and [K, Q]. The common public state of the non-terminal node 145b includes a public sequence that includes public actions $[A_{1a}, A_{2b}]$ corresponding to a vector of infosets of player 1 at the non-terminal node 145b, $\vec{I}_1$(node 145b)=$[I_{11}$(node 145b), $I_{12}$ (node 145b), $I_{13}$(node 145b)]. $I_{11}$(node 145b) can represent the information set of player 1 at the non-terminal node 145b that includes player 1's private action and the common sequence that lead to the non-terminal node 145b. That is, $I_{11}$(node 145b)=$[J, A_{1a}, A_{2b}]$. Similarly, $I_{12}$(node 145b)=$[Q, A_{1a}, A_{2b}]$; and $I_{13}$(node 145b)=$[K, A_{1a}, A_{2b}]$. The information set $I_{11}$(node 145b) can be shared by the two nodes 143b and 147b in the game three 100. The node 143b corresponds to a sequence of both private and public actions of all players in the game that leads to the node 143b. That is, $h_{143b}=[J, Q, A_{1a}, A_{2b}]$. Similarly, the node 147b corresponds to a sequence of both private and public actions of all players in the game that leads to the node 147b. That is, $h_{147 3b}=[J, K, A_{1a}, A_{2b}]$. As can be seen, $h_{143b}$ and $h_{1473b}$ share the same information set $I_{11}$(node 145b)=$[J, A_{1a}, A_{2b}]$.

In some embodiments, the strategy and Nash Equilibrium of an IIG can be represented as follows. For a player i∈N, the strategy $\sigma_i(I_i)$ in an extensive-form game assigns an action distribution over $A(I_i)$ to infoset $I_i$. A strategy profile can be denoted as $\sigma = \{\sigma_i | \sigma_i \in \Sigma_i, i \in N\}$, where $\Sigma_i$ is the set of all possible strategies for player i. $\sigma_{-1}$ refers to all strategies in σ except for $\sigma_i$. $\sigma_i(I_i)$ is the strategy of infoset $I_i$. $\sigma_i(a|h)$ refers to the probability of action a taken by player i at state h. $\forall h_1, h_2 \in I_i$, $I_i=I_i(h_1)=I_i(h_2)$, $\sigma_i(h_1)=\sigma_i(h_2)$, $\sigma_i(a|I_i)=\sigma_i(a|h_1)=\sigma_i(a|h_2)$. In some embodiments, the strategy $\sigma_i(I_i)$ specifies and comprises a respective probability $\sigma_i(a|h)$ of selecting an action a among the plurality of possible actions in the state h under the strategy $\sigma_i(I_i)$. For example, for player 1 at the node 123 of the game tree 100 in FIG. 1A, the strategy $\sigma_i(I_i)$ can include a probability $\sigma_1/(A_{1a}|\text{node } 123)$ of selecting the action $A_{1a}$ among the two possible actions $A_{1a}$ and $A_{1b}$ in the state of the node 123, and a probability $\sigma_i/(A_{1b}|\text{node } 123)$ of selecting the action $A_{1b}$ among the two possible actions $A_{1a}$ and $A_{1b}$ in the state of the node 123. If the strategy $\sigma_i(I_i)$ is uniform (e.g., an initial strategy), the probability $\sigma_1/(A_{1a}|\text{node } 123)=0.5$, and the probability $\sigma_1/(A_{1b}|\text{node } 123)=0.5$. In some embodiments, the strategy $\sigma_1(I_i)$ can be updated in each iteration of the CFR so that, when the CFR converges, a player can approach the Nash Equilibrium (or approximate Nash Equilibrium) if the player selects the actions at state h or given the information set/following probabilities specified in the strategy $\sigma_i(I_i)$. For example, if the strategy $\sigma_i(I_i)$ output by the CFR specifies the probability $\sigma_1(A_{1a}|\text{node } 123)=0.2$, and the probability $\sigma_1/(A_{1b}|\text{node } 123)=0.8$. the player can select the action $A_{1b}$ with a probability of 0.8 at state h or given the information set I to approach the Nash Equilibrium (or approximate Nash Equilibrium).

For iterative learning methods such as CFR, $\sigma^t$ refers to the strategy profile at t-th iteration. $\pi^\sigma(h)$ refers to the state reach probability (also called a state range), which is the product of strategies of all players (including chance, such as the root node 110 in game tree 100) along the history h. For an empty sequence, $\pi^\sigma(\emptyset)=1$.

In some embodiments, the reach probability can be decomposed into $$\pi^\sigma(h) = \Pi_{i \in N \cup \{c\}} \pi_i^\sigma(h) = \pi_i^\sigma(h) \sigma_{-i}^\sigma(h), \qquad (1)$$

where $\pi_i^\sigma(h)$ is the product of player i's strategy $\sigma_i$ and $\pi_{-i}^\sigma(h)$ is the product of strategies of all players' except I, denoted as $\forall h \in I_i$, $\pi_i^\sigma(h)=\pi_i^\sigma(I_i)$.

For two histories $h_1$ and $h_2$, $h1 \sqsubseteq h2$, $\pi^\sigma(h_1, h_2)$ refers to the product of all players' strategies from history h1 to h2. $\pi_i^\sigma(h_1, h_2)$ and $\pi_{-i}^\sigma(h_1, h_2)$ can be defined in a similar way. The infoset reach probability (infoset range) of $I_i$ can be defined by $\pi_i^\sigma = \Sigma_{h \in I_i} \pi_i^\sigma(h)$. Similarly, $\pi_{-i}^\sigma(I_i) = \Sigma_{h \in I_i} \pi_{-i}^\sigma(h)$.

For player i, the expected game utility can be computed by $u_i^\sigma = \Sigma_{z \in Z} \pi^\sigma(z) u_i(z)$. Given a fixed strategy profile a best response is denoted as $$br(\sigma_{-i}) = \text{argmax}_{\sigma_i' \in \Sigma_i} u_i^{(\sigma_{-i}', \sigma_{-i})}. \qquad (2)$$

An $\epsilon$-Nash equilibrium is an approximated Nash equilibrium, whose strategy profile $\sigma^* = (br(\sigma_{-i}), br(\sigma_i))$ satisfies:

$$\forall i \in N, u_i^{(br(\sigma_{-i}), \sigma_{-i})} + \epsilon \geq \max_{\sigma'_i \in \Sigma_i} u_i^{(\sigma'_i, \sigma_{-i})}. \quad (3)$$

Exploitability of a strategy $\sigma_i$ can be defined as $\epsilon_i(\sigma_i) = u_i^{\sigma^*} - u_i^{(\sigma_i, br(\sigma_i))}$. A strategy is unexploitable if $\epsilon_i(\sigma_i) = 0$. In large two player zero-sum games such as poker, $u_i^{\sigma^*}$ can be intractable to compute. However, if the players alternate their positions, the value of a pair of games is zero, i.e., $u_1^{\sigma^*} + u_2^{\sigma^*} = 0$. The exploitability of strategy profile $\sigma$ can be defined as $\epsilon(\sigma) = (u_2^{(\sigma_1, br(\sigma_1))} + u_1^{(br(\sigma_2), \sigma_2)})/2$.

CFR is an iterative method for finding a Nash equilibrium on zero-sum perfect-recall imperfect information games. A counterfactual value $v_i^{\sigma^t}(I_i)$ can be computed to represent an expected utility for player i at the information set $I_i$ under the current strategy profile $\sigma^t$, assuming that player i plays to reach $I_i$. In some embodiments, given $\sigma^t$, the counterfactual value $v_i^{\sigma^t}(I_i)$ can be computed by $$v_i^{\sigma^t}(I_i) = \sum_{h \in I_i} \pi_{-i}^{\sigma^t}(h) \sum_{h \subseteq z, z \in Z} \pi^{\sigma^t}(h, z) u_i(z) = \prod_{-i}^{\sigma^t}(I_i) U_i^{\sigma^t}[I_i]. \quad (4)$$

where $\Pi_{-i}^{\sigma^t}(I_i) \in \mathbb{R}^{1 \times d}$ is the opponent's range matrix (i.e., the reach probability of the opponent), $U_i^{\sigma^t}[I_i] \in \mathbb{R}^{d \times 1}$ is the expected utility value matrix of player i given the information set $I_i$, and d refers to the dimension.

In some embodiments, $\Pi_{-i}^{\sigma^t}(I_i)$ can be computed as the product of strategies of all players except player i along the history $h \in I_i$, representing a posterior probability of the opponent's actions given that player i reaches the current information set $I_i$ under the current strategy profile $\sigma^t$. $U_i^{\sigma^t}[I_i]$ can represent the expected utility value matrix given that player i reaches the current information set $I_i$ under the current strategy profile $\sigma$ and assuming a uniform distribution of opponent's private actions.

For example, with respect to Kuhn Poker in FIGS. 1A and 1B, $U_i^{\sigma^t}[I_i]$ can represent the expected utility value of player 1 when player 2 is dealt with a private card of J, Q, or K with a uniform distribution, respectively, while $\Pi_{-i}^{\sigma^t}(I_i)$ can be a vector of a probability of player 2 is dealt with a private card of J, Q, or K, respectively, given that player 1 reaches the current information set $I_{1i}$ under the current strategy profile $\sigma^t$.

As another example, in heads-up no-limit Texas hold'em poker (HUNL), each entry in $\Pi_{-i}^{\sigma^t}(I_i)$ refers to an opponent's range when dealt with a particular pair of private cards. Each entry in $U_i^{\sigma^t}[I_i]$ refers to the expected utility value given two players' private cards and current strategies. $v_i^{\sigma^t}(a|I_i)$ refers to the counterfactual value of action a and its regret can be computed by:

$$r_i^{\sigma_t}(a|I_i) = v_i^{\sigma_t}(a|I_i) - v_i^{\sigma_t}(I_i), \quad (5).$$

The cumulative regret of action a after t iterations is $$R_i^t(a|I_i) = R_i^{t-1}(a|I_i) + r_i^{\sigma^t}(a|I_i), \quad (6)$$

where $R_i^0(a|I_i) = 0$.

Define $R_i^{t,+}(a|I_i) = \max(R_i^t(a|I_i), 0)$, the current strategy at t+1 iteration can be computed based on regret matching according to:

$$\sigma_i^{t+1}(a|I_i) = \begin{cases} \frac{1}{|A(I_i)|}, & \text{if } \sum_{a \in A(I_i)} R_i^{t,+}(a|I_i) = 0 \\ \frac{R_i^{t,+}(a|I_i)}{\sum_{a \in A(I_i)} R_i^{t,+}(a|I_i)}, & \text{otherwise} \end{cases}. \quad (7)$$

The average strategy $\overline{\sigma}_i^T$ after T iterations can be computed by $$\overline{\sigma}_i^T(a|I_i) = \frac{\sum_{t=1}^T \pi_i^{\sigma^t}(I_i) \sigma_i^t(a|I_i)}{\sum_{t=1}^T \sum_{a \in A(I_i)} \pi_i^{\sigma^t}(I_i) \sigma_i^t(a|I_i)}. \quad (8)$$

CFR+ is similar to CFR, except that the CFR+ replaces regret matching by regret matching+ and uses a weighted average strategy. CFR and CFR+ are proven to approach Nash equilibria after enough iterations. The best known theoretical bound for CFR and CFR+ to converge to equilibrium is $$o\left(\frac{1}{\epsilon^2}\right).$$

This bound is slower than first-order methods that converge at rate $$o\left(\frac{1}{\epsilon}\right).$$

However, CFR+ empirically converges much faster than $$o\left(\frac{1}{\epsilon}\right)$$

in many games.

MCCFR computes the unbiased estimate of counterfactual value by sampling subsets of infosets in each iteration. Define $Q = \{Q_1, Q_2, \ldots, Q_m\}$, where $Q_j \subseteq Z$ is a set (block) of sampled terminal histories generated by MCCFR, such that $Q_j$ spans the set Z. Define $q_{Q_j}$ as the probability of considering block $Q_j$, where $$\sum_{j=1}^m q_{Q_j} = 1.$$

Define $a(z) = \sum_{j:z \in Q_j} q_{Q_j}$ as the probability of considering a particular terminal history z. The particular terminal history z corresponds to a sequence of actions (also referred to as a terminal sequence of actions) that include actions taken by all players that results in the terminal history z. In some embodiments, the probability of considering a particular terminal history z is a probability that the particular terminal history z is sampled (also referred to a probability of a sampled terminal sequence of actions). In some embodiments, the probability of a sampled terminal history z or the probability of a sampled terminal sequence of actions can be computed based on sampling probabilities of all actions included in the sampled terminal sequence of actions that leads to the sampled terminal history z. For example, if the sampled terminal sequence of actions that leads to the sampled terminal history z includes a sequence of actions $[A_1, A_2, \ldots, A_m]$, q(z) can be computed as a product of respective sampling probabilities of all the actions in the sampled terminal sequence of actions $[A_1, A_2, \ldots, A_m]$.

The estimate of sampled counterfactual value (also referred to as estimate counterfactual value) of $I_i$ can be computed by:

$$\tilde{v}_i^\sigma(I_i | Q_i) = \sum_{h \in I_i, z \in Q_j, h \sqsubseteq z} \frac{1}{q(z)} \pi_{-i}^\sigma(z) \pi_i^\sigma(h, z) u_i(z), \quad (9)$$

where $1/q(z)$ can represent the importance of the particular sampled terminal history z in calculating the sampled counterfactual value $\tilde{v}_i^\sigma(I_i|Q_i)$.

Define $\sigma^s$ as sampled strategy profile, where $\sigma_i^s$ is the sampled strategy of player i and $\sigma_{-i}^s$ are those for other players except for player i. The regret of the sampled action $a \in A(I_i)$ can be computed by:

$$\tilde{r}_i^\sigma(I_i, a|Q_i) = \tilde{v}_i^\sigma(I_i, a|Q_i) - \tilde{v}_i^\sigma(I_i|Q_i), \quad (10)$$

where $$\tilde{v}_i^\sigma(I_i, a|Q_j) = \Sigma_{z \in Q_j, h \sqsubseteq z, h \in I_i} \pi_i^\sigma(ha, z) u_i^s(z), \quad (11)$$

where $$u_i^s(z) = \frac{u_i(z)}{\pi_i^{\sigma^s}(z)}$$

is the utility weighted by $$\frac{1}{\pi_i^{\sigma^s}(z)}.$$

The estimate cumulative regret of action a after t iterations is $$\tilde{R}_i^t(I_i, a|Q_j) = \tilde{R}_i^{t-1}(I_i, a|Q_j) + \tilde{r}_i^{\sigma^t}(I_i, a|Q_j), \quad (12)$$

where $R_i^0(I_i, a|Q_j) = 0$.

The current strategy at t+1 iteration can be computed based on regret matching according to Eq. (7) or regret matching+ similar to the original CFR. Similarly, the average strategy $\bar{\sigma}_i^T$ after T iterations can be computed according to Eq. (8).

MCCFR provably maintains an unbiased estimate of counterfactual value and converge to Nash equilibrium. Outcome sampling and external sampling are two popular sampling methods. The original outcome sampling chooses one history according to two players' current strategy policy (or ϵ-greedy). The external sampling is very similar to outcome sampling except for one player taking all actions at her decision node. In each iteration, the classical MCCFR designates one player as the traverser, whose cumulative regret and strategy will be updated on this iteration. After that, another player will be designated as the traverser. Another sampling method, robust sampling, has been proposed, in which the traverser samples k actions and the opponent samples one action. In the robust sampling scheme, each player uses a uniform sampling method to sample at a current decision point, and the other party samples according to a corresponding strategy. The reach probability corresponding to different iterations can be fixed. It can be proved that the robust sampling scheme has a smaller variance than the outcome sampling scheme in MCCFR, while being more memory efficient than the external sampling. In some embodiments, the robust sampling scheme can make the MCCFR solve Nash equilibrium (including approximated Nash equilibrium) with faster convergence.

MCCFR and its variants can be classified into three types: value-form, semi-vector-form, and vector-form MCCFR. To make a clear explanation, these three types of MCCFR forms are explained as being applied in Kuhn Poker as shown in FIGS. 1A-B. Here, the robust sampling is used as the default sampling method and player p1 is the traverser. At each decision node, p1 samples one action according to a uniform random policy and p2 samples one action according to p2'scurrent strategy.

Value-form MCCFR: At the start of each iteration, p1 and p2 are dealt one private card respectively, such as J for p1 and Q for p2, as shown in the left subtree 103. Then they play against each other until the end. In a perfect-recall two-player imperfect information game, given public sequence and p2's private card, a particular infoset $I_2 \in \mathcal{I}_2$ can be determined. p2 samples one action according to $\sigma_2(I_2)$. In this scenario, the value-form MCCFR generates one history h on each iteration. The value of the terminal node is the game payoff.

Semi-vector-form MCCFR: Suppose p2 is dealt with private card Q and p1 is dealt with a vector of private cards [J, K]. Similar to the value-form MCCFR, these two players play against each other until the end. p1's decision node maintains a vector of infosets $\vec{I}_1 = [I_{11}, I_{12}]$ and p2's node maintains one infoset $I_2$. Also, $\vec{I}_1$ indicates a vector of policies $\vec{\sigma}_1 = [\sigma_{11}, \sigma_{12}]$. In this scenario, p2 samples one action according to $\sigma_2(I_2)$. When using robust sampling, p1 samples her actions according to uniform random policy rather than the vector of policies $\vec{\sigma}_1$, so that it is unnecessary to specify a particular current strategy as the sampling policy. Semi-vector-form MCCFR updates a vector of the traverser's regrets and strategies on each iteration. It's expected that semi-vector-form MCCFR can benefit from efficient matrix manipulation and empirically converge faster than value-form MCCFR.

Vector-form MCCFR: This method does not need to specify private cards for p1 and p2. As shown in FIG. 1B, the decision node of player $i \in [1,2]$ (e.g., non-terminal nodes 125, 135a, or 135b) maintains a vector of infosets $\vec{I}_i = [I_{i1}, I_{i2}, I_{i3}]$. In each iteration, the vector-form MCCFR generates a vector of sequences along the public tree 150 (e.g., from the node 125 to a terminal node such as the node 155b following the public sequences $[A_{1a}, A_{2b}, A_{3b}]$).

Because each decision node $\vec{I}_i$ indicates a vector of current strategies $\vec{\sigma}_i = [\sigma_{i1}, \sigma_{i2}, \sigma_{i3}]$. A sampling policy needs to be determined given the multiple current strategies in the vector of current strategies $\vec{\sigma}_i$ to sample an action out of possible actions of the player i at the decision node $\vec{I}_i$. Rather than using a uniform sampling policy so that each infoset in $\vec{I}_i$ shares the same uniform policy, several non-uniform sampling policies are described. In some embodiments, these non-uniform sampling policies can pay more attention to the relatively important action and also achieve better long-term performance.

Random Current Strategy (RCS): When using RCS, player i randomly selects one infoset $I_i$ from $\vec{I}_i$ and samples one action according to $\sigma_i^t(I_i)$.

Mean Current Strategy (MCS): This sampling policy is the mean of the current strategy over all the infosets in $\vec{I}_i$, which can be computed by $$\sigma_i^{mcs}(a|\vec{I}_i) = \frac{\sum_{I \in \vec{I}_i} \sigma_i^t(a|I_i)}{\sum_{I \in \vec{I}_i} \sum_{a \in A(I_i)} \sigma_i^t(a|I_i)} = \frac{\sum_{I \in \vec{I}_i} \sigma_i^t(a|I_i)}{|\vec{I}_i|} \quad (13)$$

The MCS gives different infosets $\{I_i\}$ in $\vec{I}_i$ the same weight.

Weighted Current Strategy (WCS): In the field of game theory, a player typically has a very low probability of taking disadvantageous action. Typically, the players make different decisions under different situations. For example, the player may need to take a more aggressive strategy after beneficial public cards are revealed in a poker game. Accordingly, in WCS, on top of the average strategy in Eq. (8), different infosets $\{I_i\}$ in $\vec{I}_i$ can be weighted differently. For example, the infoset $I_i$ can be weighted by player i's range. In this case, the WCS sampling policy can be defined by $$\sigma_i^{wcs}(a|\vec{I}_i) = \frac{\sum_{I \in \vec{I}_i} \pi_i^{\sigma^t}(I)\sigma_i^t(a|I_i)}{\sum_{I \in \vec{I}_i} \sum_{a \in A(I_i)} \pi_i^{\sigma^t}(I)\sigma_i^t(a|I_i)}. \quad (14)$$

In some embodiments, the WCS sampling strategies can include other versions, for example, by applying different or additional weights. For example, the player i's own range $\pi_i^{\sigma^t}(I_i)$ in Eq. (14) can be replaced by the opponent's range $\pi_{-i}^{\sigma^t}(I_i)$ or both players' range $\pi^{\sigma^t}(I_i)$. In many settings, the above-mentioned WCS sampling strategies can approach Nash equilibrium efficiently.

Weighted Average Strategy (WAS): In WAS, the current strategy in Eq. (13) and Eq. (14) can be replaced by the average strategy within t iterations as an approximation of Nash equilibrium. For example, by replacing the current strategy $\sigma^t$ in Eq. (13) by the average strategy $\bar{\sigma}^t$, the weighted average strategy can be defined by $$\sigma_i^{wAs}(a|\vec{I}_i) = \frac{\sum_{I \in \vec{I}_i} \pi_i^{\bar{\sigma}^t}(I)\bar{\sigma}_i^t(a|I_i)}{\sum_{I \in \vec{I}_i} \sum_{a \in A(I_i)} \pi_i^{\bar{\sigma}^t}(I)\bar{\sigma}_i^t(a|I)}. \quad (15)$$

In some embodiments, $\pi_i^{\sigma^t}(I)$ rather than $\pi_i^{\sigma^{t-1}}(I)$ can be used as the weight of each infoset in Eq. (15), because Eq. (8) and Eq. (15) share the same weight.

MCCFR learns state-action policy from the sampling experience. Variance reduction techniques used in Monte Carlo methods can be applied to MCCFR. For example, control variate is a variance reduction technique where one can lower the variance of a random variable by subtracting another random variable and adding its expectation. A baseline can be used in variance reduction techniques. A baseline allows increasing or decreasing the log probability of actions based on whether they perform better or worse than the average performance when starting from the same state. In some embodiments, to reduce the variance, a particular baseline can be specified for each counterfactual value. In some embodiments, the baseline can be a scalar. In some embodiments, the baseline-corrected CFV can be an original CFV minus the specified baseline.

In some embodiments, rather than using an expected utility value, a counterfactual value can be used as the baseline (referred to as a counterfactual value baseline) in variance reduction techniques applied to MCCFR. The variance reduction based on the counterfactual value baseline is proved to be unbiased and can be more computationally efficient than the ones based on the expected utility value baseline.

In the variance reduction with a counterfactual value baseline, estimate counterfactual value can be defined recursively. $Q_j$ refers to the sampled block, $I_i$ refers to the sampled infoset that holds $h \in I_i$, $h \sqsubseteq z$, $z \in Q_j$.

Define $b_i^{t-1}(a|I_i)$ as the state-action baseline on iteration t−1, $\sigma_i^{se,t}$ as player i's sampling policy, and $q(I_i)$ as the probability of sampling $I_i$.

In a vector-form MCCFR, $\forall h \in I_i$, $q(h)=q(I_i)$. The estimate state-action baseline on iteration t−1 can be computed as:

$$\tilde{b}_i^{t-1}(a|I_i) = b_i^{t-1}(a|I_i)\sigma_i^{se,t}(a|I_i)/q(I_i), \quad (16).$$

Given the estimated counterfactual value $\tilde{v}_i^{\sigma^t}(I_i, a|Q_j)$ for action a at infoset $I_i$, the baseline-correct or baseline-enhanced value $\hat{v}_i^{\sigma^t}(I_i, a|Q_j)$ for action a can be computed by:

$$\hat{v}_i^{\sigma^t}(I_i, a|Q_j) = \begin{cases} \tilde{b}_i^{t-1}(a|I_i), & \text{if } a \text{ is not sampled.} \\ \tilde{v}_i^{\sigma^t}(I_i, a|Q_j) + \\ \frac{(\sigma_i^{se,t}(a|I_i)-1)\tilde{b}_i^{t-1}(a|I_i)}{\sigma_i^{se,t}(a|I_i)} & \text{otherwise.} \end{cases} \quad (17)$$

The estimate counterfactual value $\tilde{v}_i^{\sigma^t}(I_i, a|Q_j)$ for infoset $I_i$ can be computed by $$\tilde{v}_i^{\sigma^t}(I_i|Q_j) = \begin{cases} \sum_{z \in I_i, z \in Q_j} \frac{1}{q(z)} \pi_{-i}^{\sigma^t}(z)u_i(z), & \text{if } I_i \text{ is terminal} \\ \sum_{a \in A(I_i)} \hat{v}_i^{\sigma^t}(I_i, a|Q_j)\sigma_i^t(a|I_i), & \text{otherwise.} \end{cases} \quad (18)$$

Define $b_i^0(a|I_i)=0$. Two example methods can be used to update the baseline. In the first method, the baseline can be updated based on the estimate counterfactual value as formulated by $$b_i^t(a \mid I_i) = \begin{cases} b_i^{t-1}(a \mid I_i), & \text{if } I_i \text{ is not sampled} \\ (1-\gamma)b_i^{t-1}(a \mid I_i) + \gamma \tilde{v}_i^{\sigma^t}(I_i, a \mid Q_j)q(I_i), & \text{otherwise} \end{cases} \quad (19)$$

In the second method, the baseline is updated based on the baseline-correct value $\hat{v}_i^{\sigma^t}(I_i, a \mid Q_j)$ as shown in Eq. (17) rather than the estimate counterfactual value $\tilde{v}_i^{\sigma^t}(I_i, a \mid Q_j)$. In other words, the $\tilde{v}_i^{\sigma^t}(I_i, a \mid Q_j)$ in Eq. (19) is replaced with the $\hat{v}_i^{\sigma^t}(I_i, a \mid Q_j)$ computed based on Eq. (17). The second baseline is also referred to as bootstrapping baseline.

The cumulative regret and average strategy can be computed following the similar formulation of the original MCCFR, for example, according to Eqs. (12) and (8), respectively. The estimate counterfactual value and baseline can be updated for all the infosets along the sampling sequence recursively.

As an example of implementing the variance reduction with a counterfactual value baseline method, for each iteration of the MCCFR, the following steps can be performed.

(a) Compute a CFV for a terminal node of a game tree or a public tree according to the upper (or first) equation of Eq. (18). In some embodiments, for a value-form implementation, computation of the CFV for a terminal node of a public tree according to Eq. (18) can be implemented as a matrix (or vector) product of a (1×d matrix) and (d×1 matrix), similar to Eq. (4). In some embodiments, for a vector-form implementation, computation of the CFV for a terminal node of a public tree according to Eq. (18) can be implemented as a matrix product of a (d×d matrix) and (d×d matrix). In some embodiments, the computation of the CFV based on the opponent's range matrix and the expected utility value matrix only need to be computed once for each public sequence for the terminal nodes of the public sequence. The CFV of non-terminal node can be based on summation of weighted CFVs of child nodes of the non-terminal node, for example, according to the lower (or second) equation of Eq. (18).

(b) Compute a baseline-corrected CFV according to Eq. (17). In a vector-form implementation, since the baseline is CFV baseline, this step may only need two d×1 matrix additions as shown in the lower equation in Eq. (17), rather than further operations based on the expected utility baseline.

(c) Compute a CFV for each nonterminal node according to the lower (or second) equation of Eq. (18). This step includes a summation of weighted child nodes' CFV. In a vector-form implementation, the obtained CFV is of a dimension of d×1.

(d) Update the baseline according to Eq. (19). This step includes a weighted average CFV by a decaying factor $\gamma$ and a probability of considering the non-terminal state, $q(I_i)$, which can be computed based on a product of sampling probabilities of a sequence of actions that leads to $I_i$. In a vector-form implementation, the resulting updated baseline is of a dimension of d×1.

(e) Recursively compute (b)-(d) along the game tree or the public tree until reaching the root node in the current iteration. The computed baseline-corrected CFV of each node can be used to compute the regret, cumulative regret, current strategy, and average strategy following the similar formulation of the original MCCFR, for example, according to Eqs. (10), (12), (7), and (8), respectively.

The above steps in the iteration can be repeated until a convergence condition is reached. The current strategy or average strategy after reaching convergence can be returned as an output of the MCCFR to approximate the Nash equilibrium.

It can be proven that the variance reduction with a counterfactual value baseline method maintains an unbiased estimate of counterfactual value. That is, if the baseline-correct counterfactual values are defined by Eq. (17) and Eq. (18), then $\forall i \in N$, $I_i \in \mathcal{I}_i$, $a \in A(I_i)$, $\sigma^t$, it holds that $E_z[\hat{v}_i^{\sigma^t}(I_i, a \mid Q_j)] = v_i^{\sigma^t}(I_i, a \mathcal{I}_i)$.

In some embodiments, the variance reduction techniques based on the counterfactual value baseline requires less computation than the one based on the expected utility value baseline. For example, according to Eq. (4), the counterfactual value $v_i^{\sigma^t}(I_i)$ can be computed as the multiplication of the opponent's range matrix $\Pi_{-i}^{\sigma^t}(I_i) \in \mathbb{R}^{1 \times d}$ and the expected utility value matrix $U_i^{\sigma^t}[I_i] \in \mathbb{R}^{d \times 1}$. When using the vector-form MCCFR, the variance reduction techniques based on the expected utility value baseline maintains a d×d matrix as the baseline, and use this baseline in a control variate to update the baseline-corrected expected utility value, which is a d×d matrix. After that, the estimate counterfactual value is the multiplication of opponent's range matrix (1×d matrix), the baseline-enhanced expected utility value (d×d matrix), and $$\frac{1}{q(z)}(1 \times 1 \text{ matrix}).$$

Different from expected utility value baseline, the variance reduction techniques with the counterfactual value baseline is more computationally efficient. In some embodiments, the counterfactual value of the vector of information set $\vec{I}_i$ is a 1×d matrix. As defined in Eq. (19), the counterfactual value baseline is updated on counterfactual values. The baseline corresponding to $\vec{I}_i$ is a 1×d matrix. Eq. (17) and Eq. (18) are the summation or aggregation over several 1×d matrixes corresponding to $\vec{I}_i$. For non-terminal states, the counterfactual values or baseline-corrected counterfactual values can be updated based on the summation or aggregation as shown in the lower (or second) equation of Eq. (18). By contrast, for the variance reduction techniques with the expected utility value baseline, the counterfactual values or baseline-corrected counterfactual values are updated based on multiplication (e.g., as shown in Eq. (4)) for all terminal and non-terminal states. As such, the computational load saved by the counterfactual value baseline relative to expected utility value baseline can depend on a depth of and/or a number of non-terminal states in the game tree or public tree that represents the environment or the IIG. The MCCFR with counterfactual value baseline is even more computationally efficient than the ones based on expected utility value baseline, if the game tree or public tree is deep and/or has a large number of non-terminal states. As an example, in HUNL, $d=1326^4$. The expected-value-based method needs to conduct at least 1326×1326 add operations to update its baseline while the counterfactual-value-based method only needs 1×1326 add operations.

In some embodiments, exploration techniques can be applied to MCCFR to achieve better performance with fewer samples. In some embodiments, a hybrid or mixture sampling policy can be used to balance exploitation and exploration, which are trade-offs in MCCFR that learn state-action policy from the sampling experience. In some embodiments, the hybrid sampling policy can be represented by:

$$\sigma_i^{se}(a|I_i)=(1-\alpha)*\sigma_i^s(a|I_i)+\alpha*\sigma_i^e(a|I_i), \quad (20)$$

where $\sigma_i^s(a|I_i)$ refers to a sampling policy, $\sigma_i^e(a|I_i)$ refers to an exploration policy. $\alpha \in [0,1]$ refers to the mixture factor, which is used to control the weight of exploration. Typically, $\alpha$ is a decay factor. For example, set $$\alpha = \frac{1}{\ln(t+10)},$$

who holds $\lim_{t\to\infty}\alpha=0$. The sampling policy $\sigma_i^s$, can be any suitable sampling policy including RCS $\sigma_i^{rcs}$, MCS $\sigma_i^{mcs}$, WAS $\sigma_i^{was}$, outcome sampling, external sampling, robust sampling, or uniform sampling. In some embodiments, both $\sigma_i^s$ and $\sigma_i^e$ holds $\Sigma_{a\in A(I_i)}\sigma_i^s(a|I_i)=1$, $\Sigma_{a\in A(I_i)}\sigma_i^e(*a|I_i)=1$. Therefore, $\sigma_i^s$ holds $\Sigma_{a\in A(I_i)}\sigma_i^{se}(a|I_i)=1$.

Define $\Delta C^t(a|I_i)$ as the sampling times for action a at infoset $I_i$ in iteration t. If the infoset L or action a is not sampled in this iteration, the $\Delta C(a|I_i)$ is 0. The cumulative sampling times can be computed by $$C^t(a|I_i) = \sum_{j=1}^{t} \Delta C^j(a|I_i). \quad (21)$$

In value-form MCCFR, such as outcome sampling, if the action a is sampled at infoset $I_i$ in iteration t, set $\Delta C^t(a|I_i)=1$. In vector-form MCCFR, when $\vec{I}_i$ is sampled, $\Delta C^t(a|I_i)$ for each infoset $I_i \in \vec{I}_i$ should be updated accordingly. In some embodiments, a single counter is used for the entire vector of information set $\vec{I}_i$ for calculating the times of the action a is sampled. In some embodiments, a mini-batch MCCFR (which is described in PCT App. No. PCT/CN2019/072200, filed on Jan. 17, 2019, entitled "SAMPLING SCHEMES FOR STRATEGY SEARCHING IN STRATEGIC INTERACTION BETWEEN PARTIES" and in U.S. application Ser. No. 16/448,390, filed on Jun. 21, 2019, entitled "SAMPLING SCHEMES FOR STRATEGY SEARCHING IN STRATEGIC INTERACTION BETWEEN PARTIES.") is used, $\Delta C^t(a|I_i)$ could be larger than 1 because a mini-batch of blocks are sampled in one iteration. The exploration policy can be computed by $$\sigma_i^{e,t}(a|I_i) = \frac{\left(1+\frac{\beta}{\sqrt{c^t(a|I_i)}}\right)}{\sum_{a\in A(I_i)}\left(1+\frac{\beta}{\sqrt{c^t(a|I_i)}}\right)}, \quad (22)$$

where $\sigma_i^{e,t}$ refers to the exploration policy in iteration t, $\beta$ is a nonnegative real number. If $\beta=0$, then $\sigma_i^{e,t}(a|I_i)$ is a uniform random exploration. If $\beta>0$ and action a at $I_i$ is sampled over and over again, $\sigma_i^{e,t}(a|I_i)$ tends to become small so that there is a potentially smaller probability to sample this action than the one without exploration. Exploration is empirically helpful in MCCFR. For example, if a cumulative regret of one action is negative, its current strategy is zero. In this situation, this action will not be sampled in the next iterations. However, this action could have a larger overall regret than other actions after long running iterations. Therefore, it will need a lot of iterations to make MCCFR change its negative regret to a positive value. When using exploration, MCCFR has a certain probability to sample this action and makes an exploration after some iterations.

Experiments have been carried out to evaluate the example techniques to accelerate the convergence of MCCFR on three different poker games: heads-up no-limit preflop hold'em poker (NLPH), heads-up no-limit flop hold'em poker (NLFH) and the river subgame of headsup no-limit Texas hold'em poker (HUNL-R). The techniques include the vector-form sampling policies, the variance reduction techniques with the counterfactual value baseline, the hybrid sampling policy with exploration, and hybrid MCCFR variants with skipping mechanism and discounting updates. The experiment results show the described MCCFR variants obtain 2 or 3 orders of magnitude improvement.

HUNL is a primary benchmark for the imperfect information game solving methods. The HUNL used in this experiment is the standard version in the Annual Computer Poker Competition. At the start of HUNL, the two players have 20000 chips. HUNL has at most four betting rounds if neither players fold in advance. The four betting rounds are named by preflop, flop, turn, and river respectively. At the start of each hand, both players are dealt with two private cards from a 52-card deck. One player at the position of the small blind should firstly put 50 chips into the pot and the other player at the big blind should put 100 chips into the pot. Their positions alternate after each hand. Each player can choose fold, call, or raise. If one player chooses fold, then she will lose the money in the pot and this hand is over. If one player chooses call, she should place a number of chips into the pot so that her total chips are equal to the opponent's chips. If one player chooses raise, she should add more chips into the pot than the opponent does. After the preflop round, three public cards are revealed and then the flop betting round occurs. After this round, another public card is dealt and the third betting round takes place. After that, the last public card is revealed, then the river round begins.

HUNL contains about $10^{161}$ infosets and is too large to traverse all the nodes. To reduce the computation, abstraction techniques such as action abstraction or card abstraction techniques can be used to solve the subgame of the full HUNL in real time. This experiment uses 1× the pot and all in the each betting round without any card abstraction.

NLPH has only one betting round and the value for the terminal node is represented by the expected game utility under the uniform random community cards, which is pre-computed and saved on the disk. NLPH contains $7.8\times10^4$ infosets and $1.0\times10^9$ states. NLFH is similar to HUNL except there are only the first two betting rounds (preflop and flop) and three community cards. NLFH is a large game and contains more than $4.3\times10^9$ infosets and $5.8\times10^{12}$ states. The HUNL-R used in our experiment refers to the forth betting round of HUNL. At the start of the round, there is $100 in the pot for each player and the ranges of both players are specified by a uniform random policy. HUNL-R contains $2.6\times10^4$ infosets and $3.5\times10^7$ states.

A set of ablation studies are conducted related to different sampling policies, exploration techniques, and variance reduction techniques with a counterfactual baseline on NLPH. Then different MCCFR methods are compared on HUNL-R and extremely large NLFH.

All the experiments were evaluated by exploitability, which was used as a standard win rate measure. The method with a lower exploitability is better. Nash equilibrium has zero exploitability. The unit of exploitability in this specification is millibig blinds per game (mbb/g). It denotes how many thousandths of a big blind one player wins on average per hand of poker. For the abstracted large games, the exploitability is computed on the abstracted game. In the experiment, $$\alpha = \frac{1}{\ln(t+10)}, \beta = \ln(t+10), \text{ and } \gamma = 0.5.$$

Other values can be used. The experiments follow the typical procedure of MCCFR to traverse the public tree or game tree separately for each player. FIGS. 2-6 show examples of simulation results of multiple MCCFR variants in the experiments. The x-axis of each figure represents the number of iterations, and the y-axis of each figure represents the exploitability. Without loss of generality, robust sampling is used as an example sampling scheme for different MCCFR variants on NLPH poker. One effective version of robust sampling is the traverser samples 1 action according to the uniform random policy and the opponent samples 1 action according to her current strategy.

Figure 2:
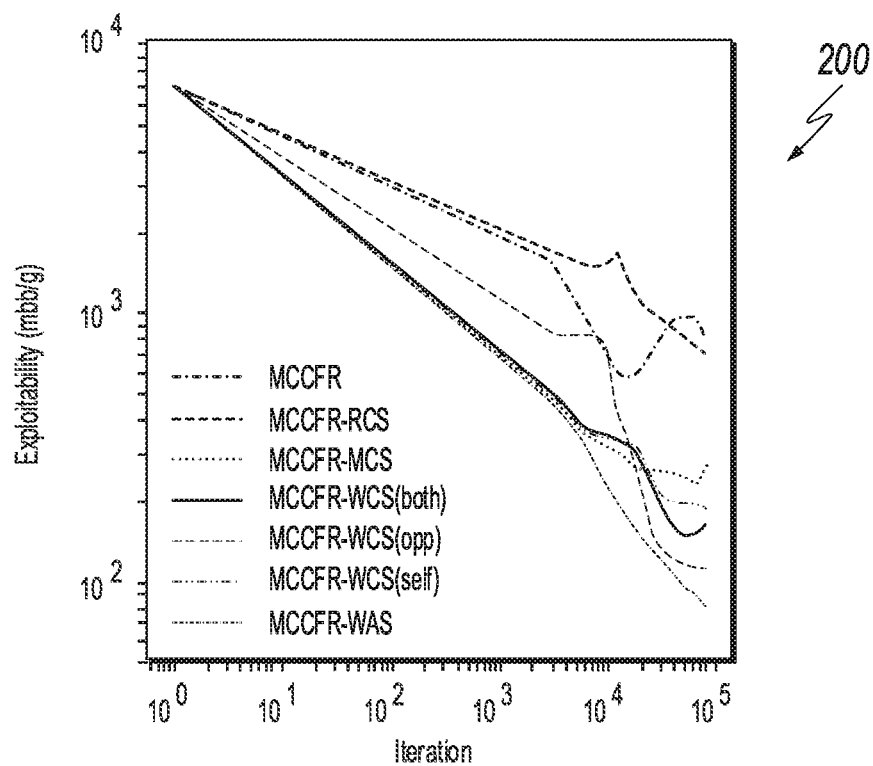
FIG. 2 is a log-log plot illustrating convergence performances of several MCCFR variants applied to NLPH with different sampling policies in accordance with embodiments of this specification.

FIG. 2 is a log-log plot 200 illustrating convergence performances of several MCCFR variants applied to NLPH with different sampling policies in accordance with embodiments of this specification. MCCFR refers to the semi-vector-form MCCFR. MCCFR-RCS, MCCFR-MCS, MCCFR-WCS, and MCCFR-WAS refer to the vector-form MCCFR variants with different MCS, WCS, and WAS sampling policies, respectively. The results showed that MCCFR-RCS achieved similar convergence with semi-vector-form MCCFR because RCS randomly selected infoset $I_i$ from $\vec{T}_i$ and sampled one action according to $\sigma I^i$. Such random selection does not consider the importance of different infosets. Except for MCCFR-RCS, other vector-form MCCFR variants achieve 2 or 3 orders of magnitude improvement against the semi-vector-form MCCFR. The WCS and WAS, which weighted each infoset by the range, have better long-term performance than MCS. Note that, typically semi-vector-form MCCFR converges faster than its value-form version so a convergence curve for the value-form MCCFR is not presented in FIG. 2. In the remaining experiments, WCS weighted by both player's ranges is selected as the sampling policy.

Figure 3:
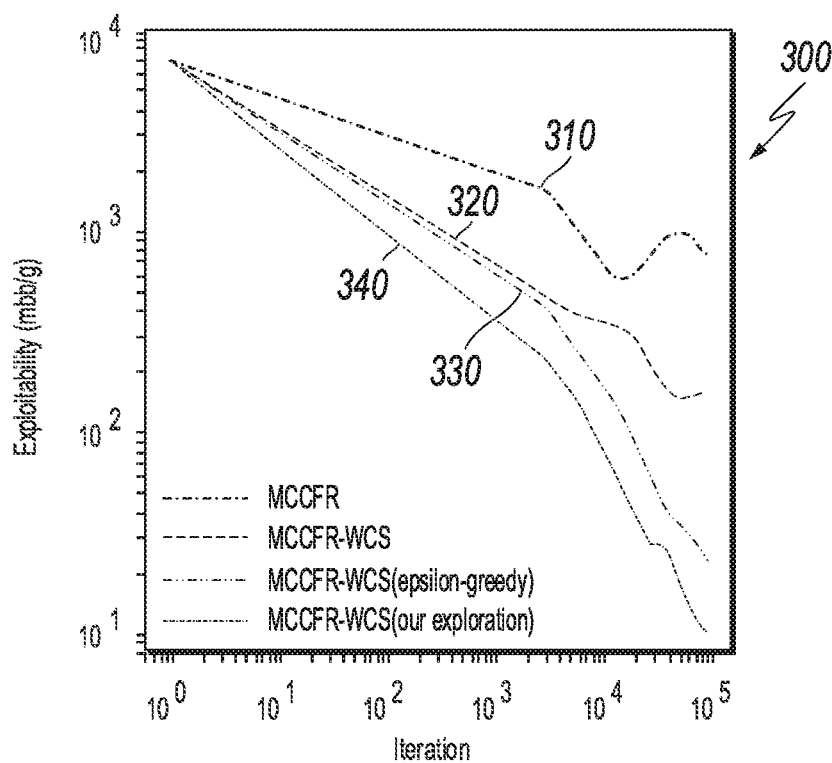
FIG. 3 is a log-log plot illustrating convergence performances of several MCCFR variants applied to NLPH with and without exploration techniques in accordance with embodiments of this specification.

FIG. 3 is a log-log plot 300 illustrating convergence performances of several MCCFR variants applied to NLPH with and without exploration techniques in accordance with embodiments of this specification. Specifically, the convergence curves 310, 320, 330 and 340 correspond to MCCFR, MCCFR-WCS without exploration, MCCFR-WCS with an ϵ-greedy exploration, and MCCFR-WCS with the example exploration technique described w.r.t. Eq. (20), respectively. FIG. 3 shows that MCCFR-WCS outperforms MCCFR, and MCCFR-WCS with ϵ-greedy exploration and the example exploration technique described w.r.t. Eq. (20) outperform MCCFR-WCS in terms of the convergence performances. Moreover, MCCFR-WCS with the example exploration technique described w.r.t. Eq. (20) converges even faster than the one with the ϵ-greedy exploration, because the former exploration technique takes into consideration sampled frequencies of different actions.

Figure 4A:
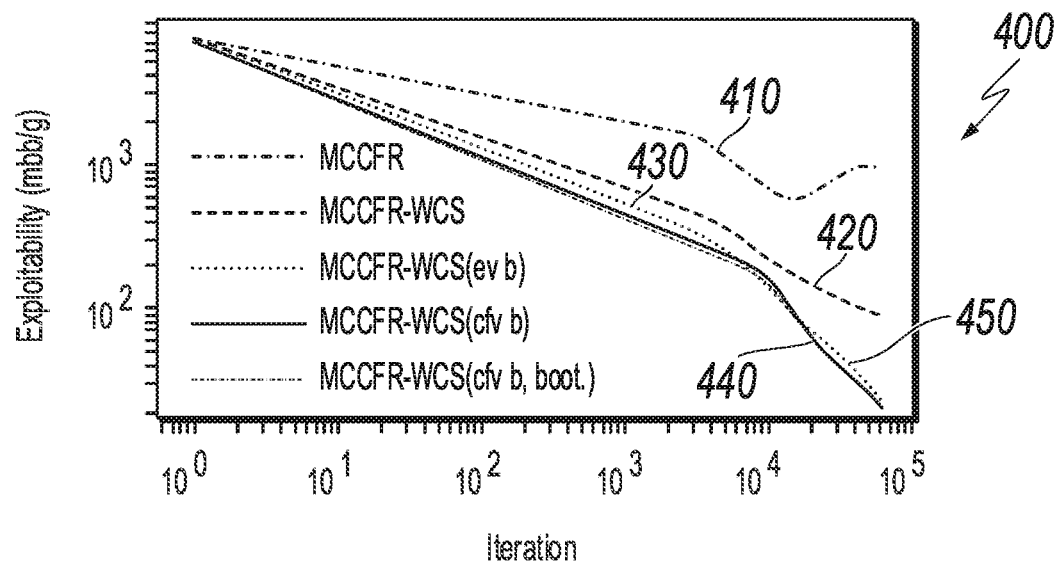
FIG. 4A is a log-log plot illustrating convergence performances of several MCCFR variants applied to NLPH with and without different variance reduction techniques in accordance with embodiments of this specification.

FIG. 4A is a log-log plot 400 illustrating convergence performances of several MCCFR variants applied to NLPH with and without different variance reduction techniques in accordance with embodiments of this specification. Specifically, the convergence curves 410, 420, 430, 440, and 450 correspond to MCCFR, MCCFR-WCS without any variance reduction technique, with a variance reduction technique using an expected utility value baseline (denoted as MCCFR-WCS(ev b)), with a variance reduction technique using the CFV baseline described w.r.t. Eq. (19) (denoted as MCCFR-WCS(cfv b)), and with a variance reduction technique using the CFV bootstrapping baseline (denoted as MCCFR-WCS(cfv b, boot)), respectively.

As shown in FIG. 4A, vector-form MCCFR variants converge faster when using variance reduction technique (e.g., control variate techniques). Moreover, the variance reduction technique using the CFV baseline (e.g., both MCCFR-WCS(cfv b) and MCCFR-WCS(cfv b, boot)) outperforms the one with expected utility value baseline, MCCFR-WCS(ev b). Furthermore, the MCCFR with expected utility value baseline needs to conduct 1326×1326 add operations for each sampled node, which is much more time-consuming than our counterfactual value baseline. To make a fair comparison, the convergence comparison by running time is provided in FIG. 4A.

Figure 4B:
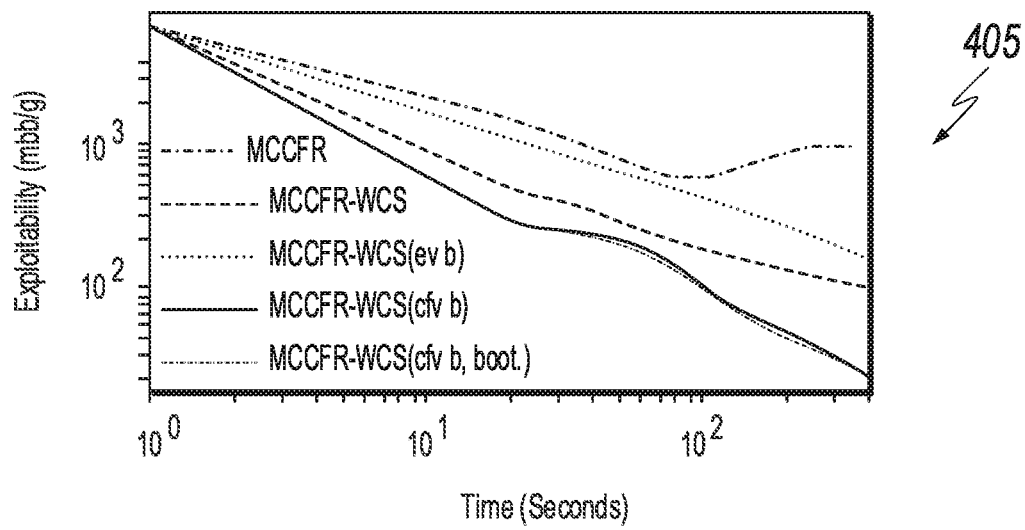
FIG. 4B is a log-log plot illustrating example computational efficiencies of several MCCFR variants applied to NLPH with and without different variance reduction techniques in accordance with embodiments of this specification.

FIG. 4B is a log-log plot 405 illustrating example computational efficiencies of several MCCFR variants applied to NLPH with and without different variance reduction techniques in accordance with embodiments of this specification. In the experiment, a semi-vector-form MCCFR (denoted as MCCFR) costs 5.9 seconds every 1000 iterations; the vector-form MCCFR-WCS (denoted as MCCFR-WCS) costs 6.2 seconds; the method with counterfactual baseline (e.g., either MCCFR-WCS(cfv b) and MCCFR-WCS(cfv b, boot)) costs 6.5 seconds and the method with expected utility value baseline (denoted as MCCFR-WCS(ev b)) costs 48.7 seconds.

Although the vector-form MCCFR samples more infosets than semi-vector-form MCCFR on each iteration, they cost similar computation time because of the benefit of the matrix manipulation. Empirically, the method with bootstrapping baseline (MCCFR-WCS(cfv b, boot)) converged slightly faster than the one using the CFV baseline described w.r.t. Eq. (19) (denoted as MCCFR-WCS(cfv b)). In the remaining experiment, the method with bootstrapping counterfactual baseline is selected as a default MCCFR variant.

Figure 5A:
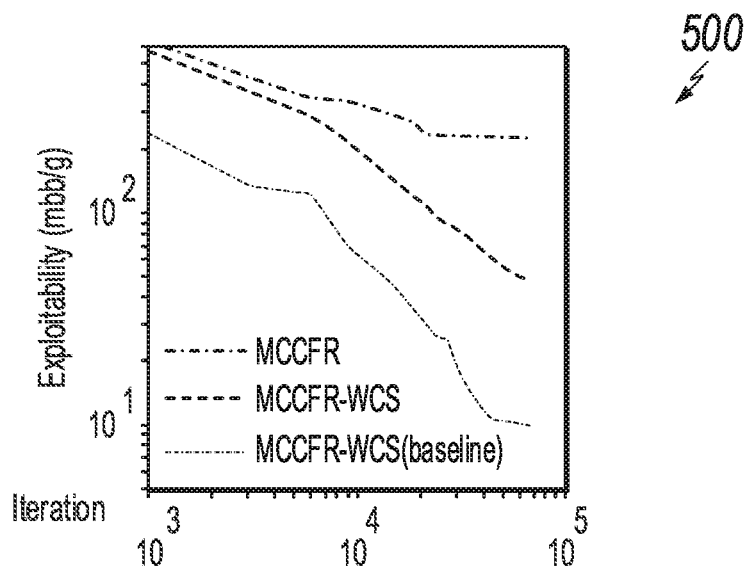
FIGS. 5A-5C are log-log plots illustrating convergence performances of several MCCFR variants by external sampling on three different poker games: NLPH, HUNL-R, and NLFH, in accordance with embodiments of this specification.
Figure 5B:
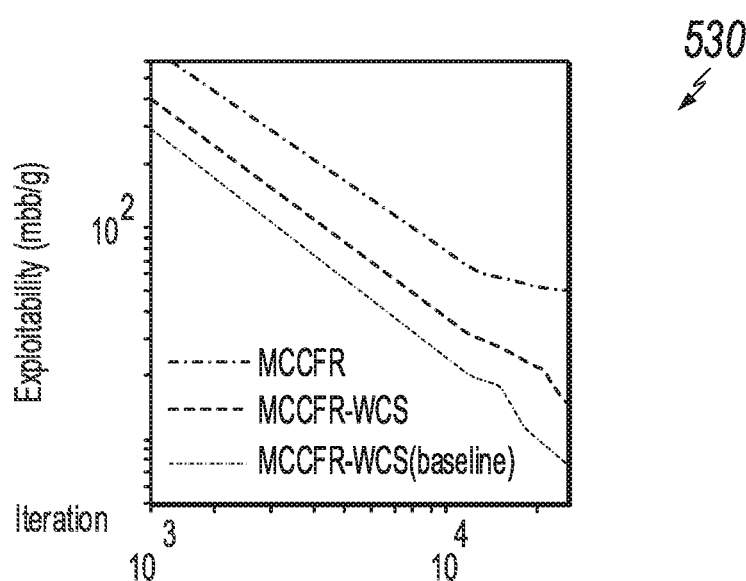
Figure 5C:
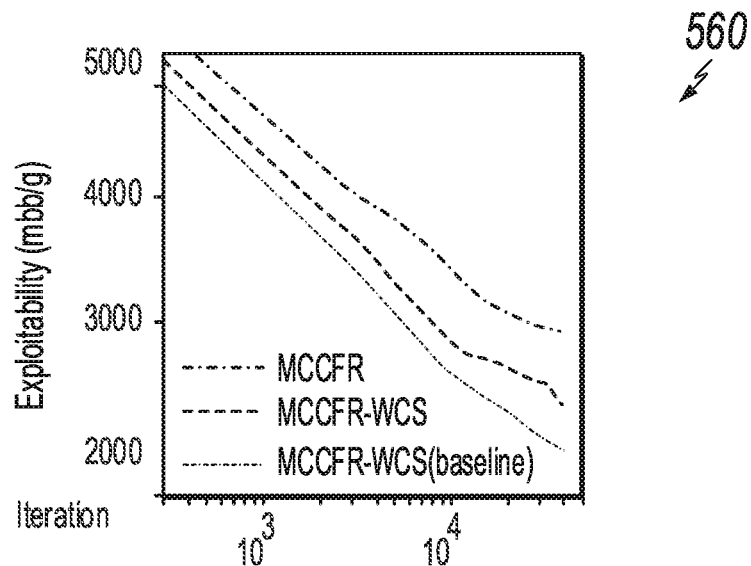

FIGS. 5A-5C are log-log plots 500, 530, and 560 illustrating convergence performances of several MCCFR variants by external sampling on three different poker games: NLPH, HUNL-R and NLFH, in accordance with embodiments of this specification. FIGS. 5A-5C show that MCCFR with the described WCS sampling policy and bootstrapping baseline can significantly improve the convergence of MCCFR in many settings (including an extremely large game NLFH). The improved MCCFR could benefit many poker AIs and help them achieve better strategy in less running time.

Figure 6A:
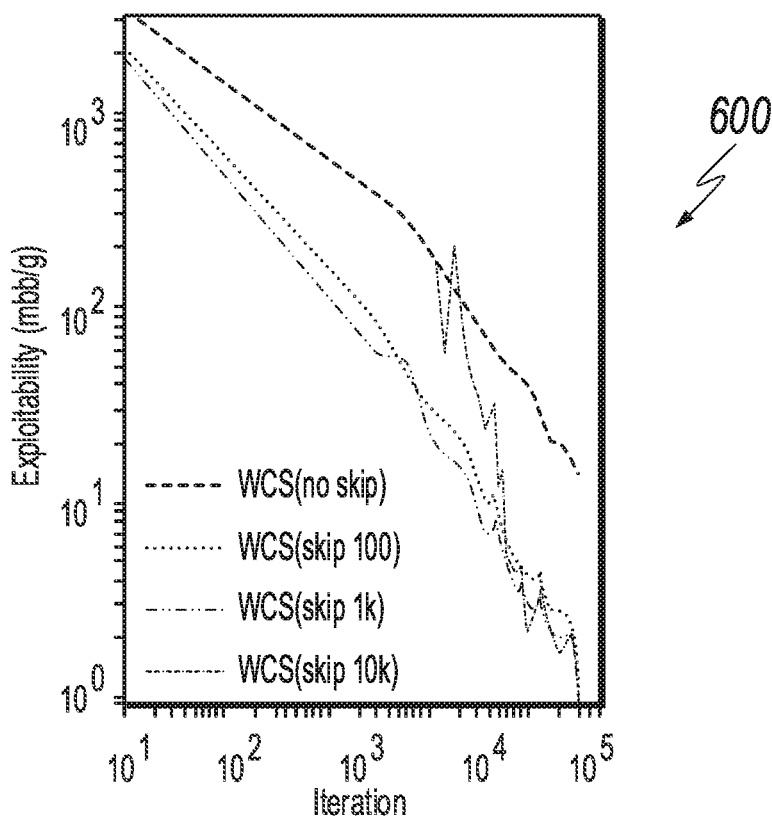
FIG. 6A is log-log plot illustrating convergence performances of several MCCFR variants with and without skipping on NLPH in accordance with embodiments of this specification.

FIG. 6A is log-log plot 600 illustrating convergence performances of several MCCFR variants with and without skipping on NLPH in accordance with embodiments of this specification. The experiments are performed by external sampling vector-form MCCFR. In CFR, the cumulative regret is initialized by zero and the current strategy starts from a uniform random strategy. In some embodiments, only the average strategy profile within all iterations is proved to converge to Nash equilibrium. In some embodiments, skipping previous iterations of CFR can obtain faster convergence of MCCFR. FIG. 6A shows that the MCCFR variants with different skipping iterations significantly improve the performance on NLPH. FIG. 6A shows the long-term performance of the MCCFR algorithm on NLPH over a long iteration horizon. The method with skipping previous 10000 iterations (denoted as WCS(skip 10 k)) converged to 0.94-Nash equilibrium. This exploitability was considered sufficiently converged in Texas hold'em.

Figure 6B:
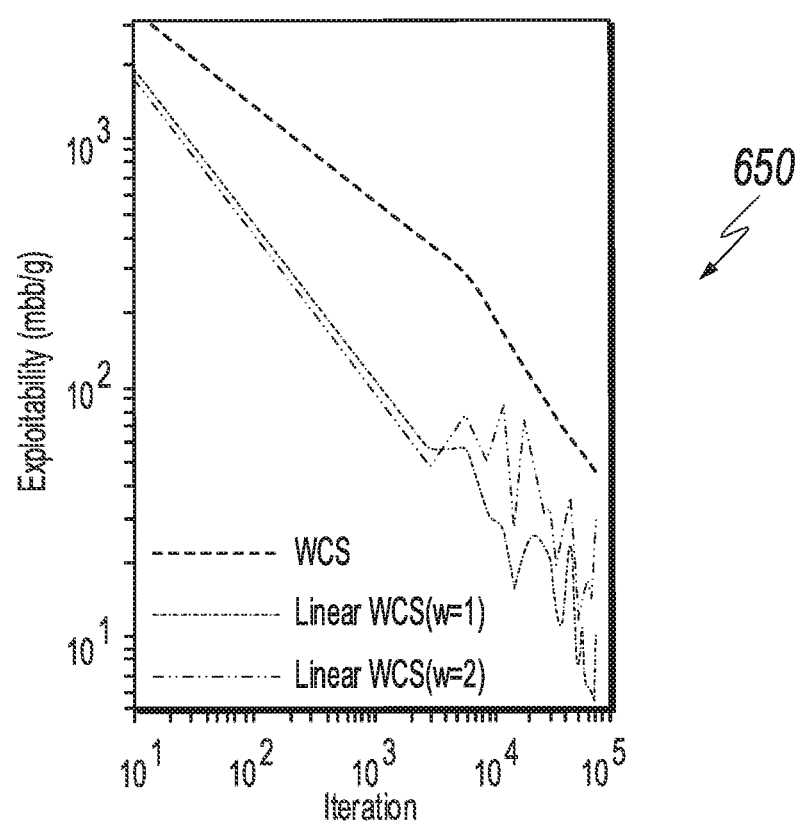
FIG. 6B is log-log plot illustrating convergence performances of MCCFR variants with and without skipping on NLPH in accordance with embodiments of this specification.

FIG. 6B is log-log plot 650 illustrating convergence performances of MCCFR variants with and without skipping on NLPH in accordance with embodiments of this specification. The experiments are performed by external sampling vector-form MCCFR. As a discounting mechanism, a linear MCCFR weights the regrets and average strategies with a value dependent on the iteration t. In the experiment, this discounting mechanism is combined with the vector-form MCCFR with a specified weight of $t^w$. FIG. 6B shows that the linear MCCFR with a weight $t^w$, where w=1 and w=2 (denoted as Linear WCS (w=1) and Linear WCS (w=1)), improves the convergence more than the vector-form MCCFR without discounting (denoted as WCS).

Figure 7:
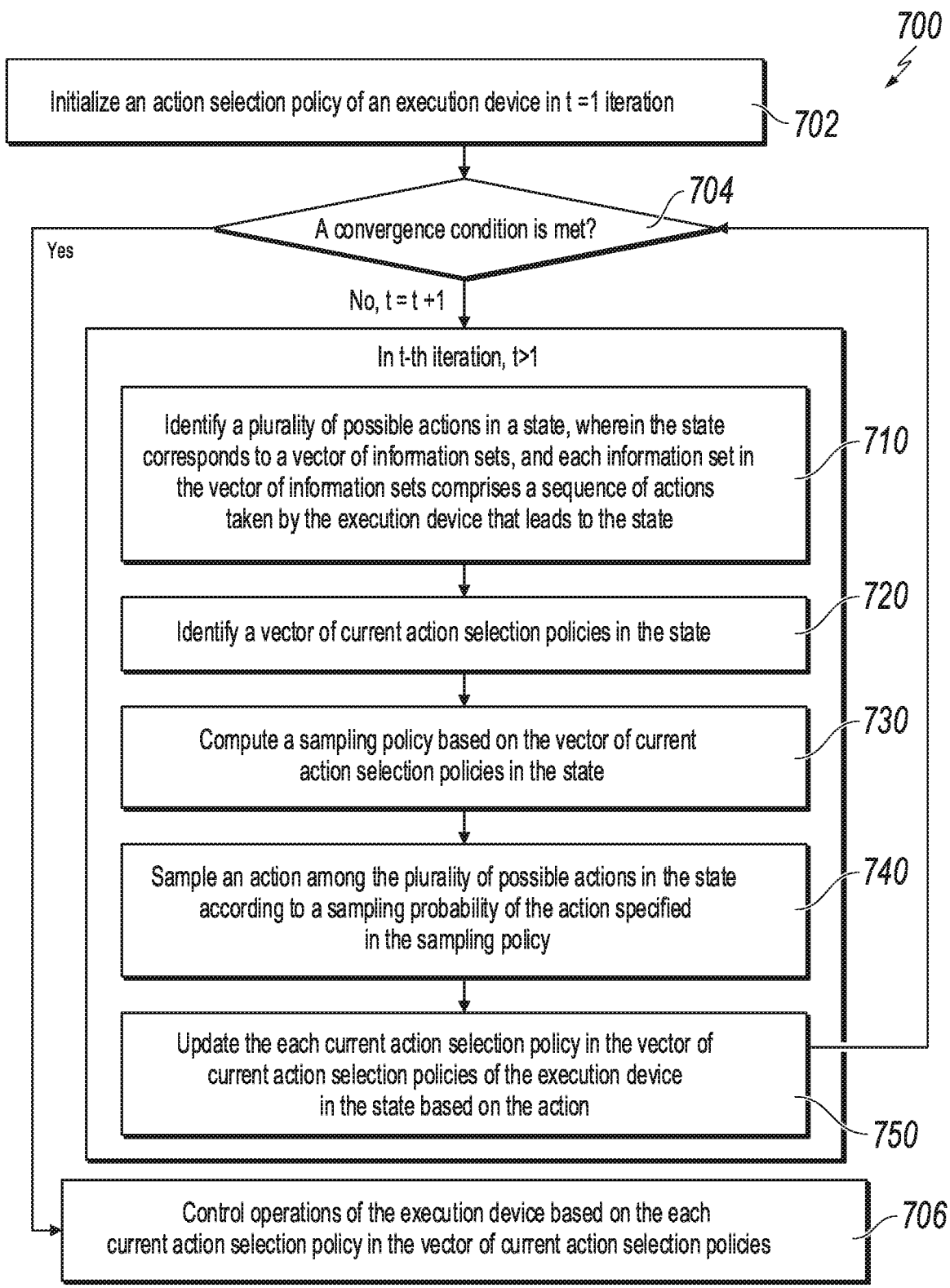
FIG. 7 is a flowchart of an example of a process for performing Monte Carlo counterfactual regret minimization (MCCFR) for determining action selection policies for software applications in accordance with embodiments of this specification.

FIG. 7 is a flowchart of an example of a process 700 for performing Monte Carlo counterfactual regret minimization (MCCFR) for determining action selection policies for software applications in accordance with embodiments of this specification. The process 700 can be an example of the MCCFR algorithm with a sampling scheme described above.

The example process 700 shown in FIG. 7 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 7 can be executed as multiple separate operations, or one or more subsets of the operations shown in FIG. 7 can be combined and executed as a single operation.

In some embodiments, the process 700 can be performed in an iterative manner, for example, by performing two or more iterations. In some embodiments, the process 700 can be used in automatic control, robotics, or any other applications that involve action selections. In some embodiments, the process 700 can be performed by an execution device for generating an action selection policy (e.g., a strategy) for completing a task (e.g., finding Nash equilibrium) in an environment that includes the execution device and one or more other devices. In some embodiments, generating the action selection policy can include some or all operations of the process 700, for example, by initiating an action selection policy at 702 and updating the action selection policy at 750 over iterations. The execution device can perform the process 700 in the environment for controlling operations of the execution device according to the action selection policy.

In some embodiments, the execution device can include a data processing apparatus such as a system of one or more computers, located in one or more locations, and programmed appropriately in accordance with this specification. For example, a computer system 1000 of FIG. 10, appropriately programmed, can perform the process 700. The execution device can be associated with an execution party or player. The execution party or player and one or more other parties (e.g., associated with the one or more other devices) can be participants or players in an environment, for example, for strategy searching in strategic interaction between the execution party and one or more other parties.

In some embodiments, the environment can be modeled by an imperfect information game (IIG) that involves two or more players. In some embodiments, the process 700 can be performed to solve an IIG, for example, by the execution party supported by the application. The IIG can represent one or more real-world scenarios such as resource allocation, product/service recommendation, cyber-attack prediction and/or prevention, traffic routing, fraud management, etc., that involve two or more parties, where each party may have incomplete or imperfect information about the other party's decisions. As an example, the IIG can represent a collaborative product-service recommendation service that involves at least a first player and a second player. The first player may be, for example, an online retailer that has customer (or user) information, product and service information, purchase history of the customers, etc. The second player can be, for example, a social network platform that has social networking data of the customers, a bank or another financial institution that has financial information of the customers, a car dealership, or any other party that may have information of the customers on the customers' preferences, needs, financial situations, locations, etc. in predicting and recommending products and services to the customers. The first player and the second player may each have proprietary data that the player does not want to share with others. The second player may only provide partial information to the first player at different times. As such, the first player may only have limited access to the information of the second player. In some embodiments, the process 700 can be performed for making a recommendation to a party with the limited information of the second party, planning a route with limited information.

At 702, an action selection policy (e.g., a strategy $\sigma_i^t$) in a first iteration, i.e., t=1 iteration, is initialized. In some embodiments, an action selection policy can include or otherwise specify a respective probability (e.g., $\sigma_i^t(a_j|I_i)$) of selecting an action (e.g., $a_j$) among a plurality of possible actions in a state (e.g., a current state i) of the execution device (e.g., the device of the execution device that performs the process 700). The current state results from a previous action taken by the execution device in a previous state, and each action of the plurality of possible actions leads to a respective next state if performed by the execution device when the execution device is in the current state.

In some embodiments, a state can be represented by a node of the game tree (e.g., a non-terminal node 123, 127, 143b, or 147b or a terminal node 143a, 153a, 153b, 143c, 143d, 147a, 157a, 157b, 147c, or 147d of the game tree 100). In some embodiments, the state can be a public state represented by a node of a public tree (e.g., a non-terminal node 125, 135a, 135b, or 145b, or a terminal node 145a, 145c, 145d, 155a, or 155b of the public tree 150).

In some embodiments, the strategy can be initialized, for example, based on an existing strategy, a uniform random strategy (e.g. a strategy based on a uniform probability distribution), or another strategy (e.g. a strategy based on a different probability distribution). For example, if the system warm starts from an existing CFR method (e.g., an original CFR or MCCFR method), the iterative strategy can be initialized from an existing strategy profile to clone existing regrets and strategy.

At 704, whether a convergence condition is met is determined. MCCFR typically includes multiple iterations. The convergence condition can be used for determining whether to continue or terminate the iteration. In some embodiments, the convergence condition can be based on exploitability of a strategy σ. According to the definition of exploitability, exploitability should be larger than or equal to 0. The smaller exploitability indicates a better strategy. That is, the exploitability of converged strategy should approach 0 after enough iterations. For example, in poker, when the exploitability is less than 1, the time-average strategy is regarded as a good strategy and it is determined that the convergence condition is met. In some embodiments, the convergence condition can be based on a predetermined number of iterations. For example, in a small game, the iterations can be easily determined by the exploitability. That is, if exploitability is small enough, the process 700 can terminate. In a large game, the exploitability is intractable and typically a large parameter for iteration can be specified. After each iteration, a new strategy profile can be obtained, which is better than the old one. For example, in a large game, the process 700 can terminate after a sufficient number of iterations.

If the convergence condition is met, no further iteration is needed. The process 700 proceeds to 706. Operations of the execution device are controlled according to the each current action selection policy in the vector of current action selection policies. For example, the each current action selection policy in the current iteration, or an average action selection policy across the t iterations can be output as control commands to control one or more of a direction, speed, distance, or other operation of an engine, motor, valve, actuator, accelerator, brake, or other device in an autonomous vehicle or other applications. If the convergence condition is not met, t is increased by 1, and the process 700 proceeds to a next iteration, wherein t>1.

In a current iteration (e.g., t-th iteration), at 710, a plurality of possible actions in a state of the execution device is identified. In some embodiments, as mentioned above, the state can be a public state represented by a node of a public tree (e.g., a non-terminal node 125, 135a, 135b, or 145b, or a terminal node 145a, 145c, 145d, 155a, or 155b of the public tree 150). The state can correspond to a vector of information sets, and each information set in the vector of information sets comprises a sequence of actions taken by the execution device that leads to the state. For example, as shown in FIG. 1B, the state represented by the node in the public tree 150 can maintains a vector of infosets $\vec{I}_i = [I_{i1}, I_{i2}, I_{i3}]$.

In some embodiments, the state corresponds to a public sequence that comprises one or more actions publically known by the execution device and the one or more other devices that in a trajectory starting from an initial state (e.g., a root node of the public tree) and ending in the state. For example, the state of the node 155b corresponds to a public sequence (e.g., the public sequences [$A_{1a}$, $A_{2b}$, $A_{3b}$,]) that comprises one or more actions publically known by the execution device (e.g., $A_{1a}$, and $A_{3b}$,]) and the one or more other devices (e.g., $A_{2b}$) from the root node 125 to following the node 155b. The each information set in the vector of information sets comprises the public sequence. In some embodiments, the each information set in the vector of information sets also comprises one or more non-public actions (e.g., taken by the execution device or chance) along the trajectory from an initial state (e.g., a root node of the public tree) and ending in the state. For example, each information set in the vector of information sets at the state of node 155b comprises the public sequence [$A_{1a}$, $A_{2b}$, $A_{3b}$,], and respective non-public actions (e.g., card J, Q, K dealt by chance).

As shown in FIG. 1B, with a corresponding vector of information sets, the state represented by the node of the public tree that represents the environment is associated with or corresponds to a plurality of possible actions in the state. For example, the node 125 as shown in public tree 150 is associated with multiple actions (e.g., actions $A_{1a}$, and $A_{1b}$) of the state that lead to respective next states (e.g., node 135a and node 135b). As another example, another state (e.g., node 145b) of the execution device is associated with multiple actions (e.g., actions $A_{3a}$, and $A_{3b}$) of the state that lead to respective next states (e.g., node 155a and node 155b), where the node 145b results from a previous action $A_{2b}$ taken by the execution device in a previous state (e.g., node 135a).

In some embodiments, the plurality of possible actions in the state of the execution device is identified, for example, by reading a data structure representing the environment (e.g., a public tree of an IIG). The data structure can include respective plurality of possible actions in each of the states of the environment.

At 720, a vector of current action selection policies in the state (e.g., a vector of current strategies $\vec{\sigma}_i = [\sigma_{i1}, \sigma_{i2}, \sigma_{i3}]$) is identified. In some embodiments, the vector of current action selection policies in the state is an action selection policy in the state in the current iteration t (but the annotate of the iteration t is omitted for simplicity). In some embodiments, each current action selection policy in the vector of current action selection policies corresponds to an information set in the vector of information sets (e.g., the vector of infosets $\vec{I}_i = [I_{i1}, I_{i2}, I_{i3}]$). The action selection policy specifies a respective probability of selecting an action among the plurality of possible actions in the state. For example, the action selection policy $\sigma_{i1}$ corresponds to $I_{i1}$ in the vector of infosets $\vec{I}_i$ in the state. If the state is the node 125 of public tree 150 in FIG. 1B, the action selection policy $\sigma_{i1}$ specifies a probability of selecting the action $A_{1a}$ and a probability of selecting the action $A_{1b}$ in the state under the action selection policy $\sigma_{i1}$ in the current iteration t.

In some embodiments, the vector of current action selection policies in the state in the current iteration is identified by identifying an initial vector of current action selection policies in the state at 702, or by identifying an updated vector of current action selection policies in the state in a previous iteration, for example, according to 750.

At 730, a sampling policy is computed based on the vector of current action selection policies in the state, wherein the sampling policy specifies a respective sampling probability corresponding to each of the plurality of possible actions in the state. In some embodiments, the sampling policy comprises a probability distribution over the plurality of actions at the state.

Note that a sampling policy is different from an action selection policy (e.g., the current action selection policy), although both can be a probability distribution across the plurality of possible actions in the state. The sampling policy is used in MCCFR to determine which trajectories or paths in an environment to sample in a Monte Carlo method, rather than traversing all possible trajectories or paths in the environment. The sampling policy is used to compute a probability of a sampled terminal trajectory (i.e., a sequence of actions), which is used for computing sampled counterfactual value (also referred to as estimate counterfactual value) to approximate a (actual) counterfactual value that is computed based on traversing all the possible trajectories or paths in the environment.

On the other hand, regardless sampling is used or not, the action selection policy can be a strategy that specifies and/or comprises a respective probability (e.g., $\sigma_i(a|h)$) of selecting an action a among the plurality of possible actions in the state h under the strategy, for example, to complete the task and approach a Nash Equilibrium. The action selection policy can be updated in each iteration of a CFR algorithm. In some embodiments, the output of the CFR algorithm can be the action selection policy (or an average action selection policy across multiple iterations) that specifies a respective probability of selecting an action among the plurality of possible actions in each state of the IIG (under the strategy of the best response as described w.r.t. Eq. (2)) so that the player can approximate or achieve the Nash Equilibrium.

In some embodiments, in MCCFR, once an action is sampled according to the sampling policy, then the action selection policy can be updated based on one or more of a regret, CFV, and other values calculated based on the sampled action. In some embodiments, a sampling policy is independent from the action selection policy, for example, in a value-form MCCFR. In a vector-form MCCFR, there are multiple action selection policies in a state (e.g., a vector of action selection policies corresponding to the vector of information sets). In some embodiments, the sampling policy can be independent from the action selection policy (e.g., according to a uniform or another specified distribution). In some embodiments, the sampling policy can be computed based on the multiple action selection policies that correspond to the vector of information sets.

In some embodiments, the sampling policy can be computed based on the vector of current action selection policies in the state, for example, according to Random Current Strategy (RCS), Mean Current Strategy (MCS), Weighted Current Strategy (WCS), Weighted Average Strategy (WAS), or any other method that relates the sampling policy to the multiple current action selection policies in the state.

In some embodiments, computing a sampling policy based on the vector of current action selection policies of the execution device in the state comprises computing the sampling probability corresponding to each of the plurality of possible actions in the state as a mean value of current action selection policies of each of the plurality of possible actions in the state over the vector of information sets, for example, according to Eq. (13).

In some embodiments, computing a sampling policy based on the vector of current action selection policies of the execution device in the state comprises computing the sampling probability corresponding to each of the plurality of possible actions in the state based on current action selection policies of each of the plurality of possible actions in the state and respective reach probabilities of the vector of information sets. In some embodiments, computing the sampling probability corresponding to each of the plurality of possible actions in the state based on current action selection policies of each of the plurality of possible actions in the state and respective reach probabilities of the vector of information sets comprises computing the sampling probability corresponding to each of the plurality of possible actions in the state based on a sum of the current action selection policies of each of the plurality of possible actions in the state weighted by the respective reach probabilities of the vector of information sets, for example, according to Eq. (14).

In some embodiments, computing a sampling policy based on the vector of current action selection policies of the execution device in the state comprises computing the sampling probability corresponding to each of the plurality of possible actions in the state based on average action selection policies of each of the plurality of possible actions in the state and respective reach probabilities of the vector of information sets. In some embodiments, computing the sampling probability corresponding to each of the plurality of possible actions in the state based on average action selection policies of each of the plurality of possible actions in the state and respective reach probabilities of the vector of information sets comprises computing the sampling probability corresponding to each of the plurality of possible actions in the state based on a sum of the average action selection policies of each of the plurality of possible actions in the state weighted by the respective reach probabilities of the vector of information sets, for example, according to Eq. (15).

At 740, an action among the plurality of possible actions in the state is sampled according to a sampling probability of the action specified in the sampling policy. For example, for player 1 at the node 135a of the game tree 150 in FIG. 1B, the sampling policy can include a sampling probability of sampling the action $A_{1a}$ among the two possible actions $A_{1a}$ and $A_{1b}$ in the state of the node 135a (say a probability of 0.3), and a sampling probability of sampling the action $A_{1b}$ among the two possible actions $A_{1a}$ and $A_{1b}$ in the state of the node 135a (say a probability of 0.7). The action $A_{1b}$ can be sampled with a higher probability of 0.7 at the node 135a than the action $A_{1a}$. The sampled action $A_{1b}$ can be used for updating the current action selection policy for the next iteration.

At 750, the each current action selection policy in the vector of current action selection policies of the execution device in the state is updated based on the action (e.g., sampled action Albin the above example). In some embodiments, updating the each current action selection policy in the vector of current action selection policies of the execution device in the state based on the action comprises performing Monte Carlo counterfactual regret minimization (MCCFR) based on the action, for example, according to some or all of Eqs. (4)-(12). For example, updating the each current action selection policy in the vector of current action selection policies of the execution device in the state based on the action comprises: calculating a probability of a sampled terminal sequence of actions based on the sampling probability of the action (e.g., $q(z)=\Sigma_{j:z \in Q_j} q_{Q_j}$), the sampled terminal sequence of actions including the action and a terminal state for completing a task; calculating a sampled counterfactual value of the action based on the probability of the sampled terminal sequence of actions (e.g., according to Eq. (9)); calculating a regret value of the action based on the sampled counterfactual value of the action (e.g., according to some or all of Eqs. (10)-(12)); and updating the each of the vector of current action selection policies of the execution device in the state based on the regret value of the action (e.g., according to regret matching based on Eq. (7) or regret matching+). In some embodiments, an average strategy $\bar{\sigma}_i^t$ after the current iteration can be computed, for example, according to Eq. (8).

After 750, the process 700 can go back to 704 to determine whether a convergence condition is met. In some embodiments, in response to determining that the convergence condition is met, operations of the execution device are controlled based on the action selection policy. In some embodiments, in response to determining that the convergence condition is met, an average action selection policy across all iterations (e.g., from the first iteration to the current iteration) in each state can be computed, for example, according to Eq. (8). In some embodiments, the average action selection policy can serve as an output of the process 700, for example, as the computed Nash equilibrium.

In some embodiments, the action selection policy can serve as an output of the software-implemented application to automatically control the execution device's action at each state, for example, by selecting the action that has the highest probability among a plurality of possible actions based on the action selection policy. As an example, the environment comprises a traffic routing environment, the execution device supported by the application comprises a computer-assisted vehicle, the action selection policy comprises a route selection policy for controlling directions of the computer-assisted vehicle, and controlling operations of the execution device according to the action selection policy comprises controlling directions of the computer-assisted vehicle according to the route selection policy. Controlling operations of the computer-assisted vehicle may include controlling one or more of a throttle, steering, braking, navigation, engine mode to achieve directions, speeds, other parameters specified in the route selection policy that is generated according to the process 700 to complete the task of, for example, reaching a desired destination in the environment that includes other computer-assisted vehicles sharing roads.

Figure 8:
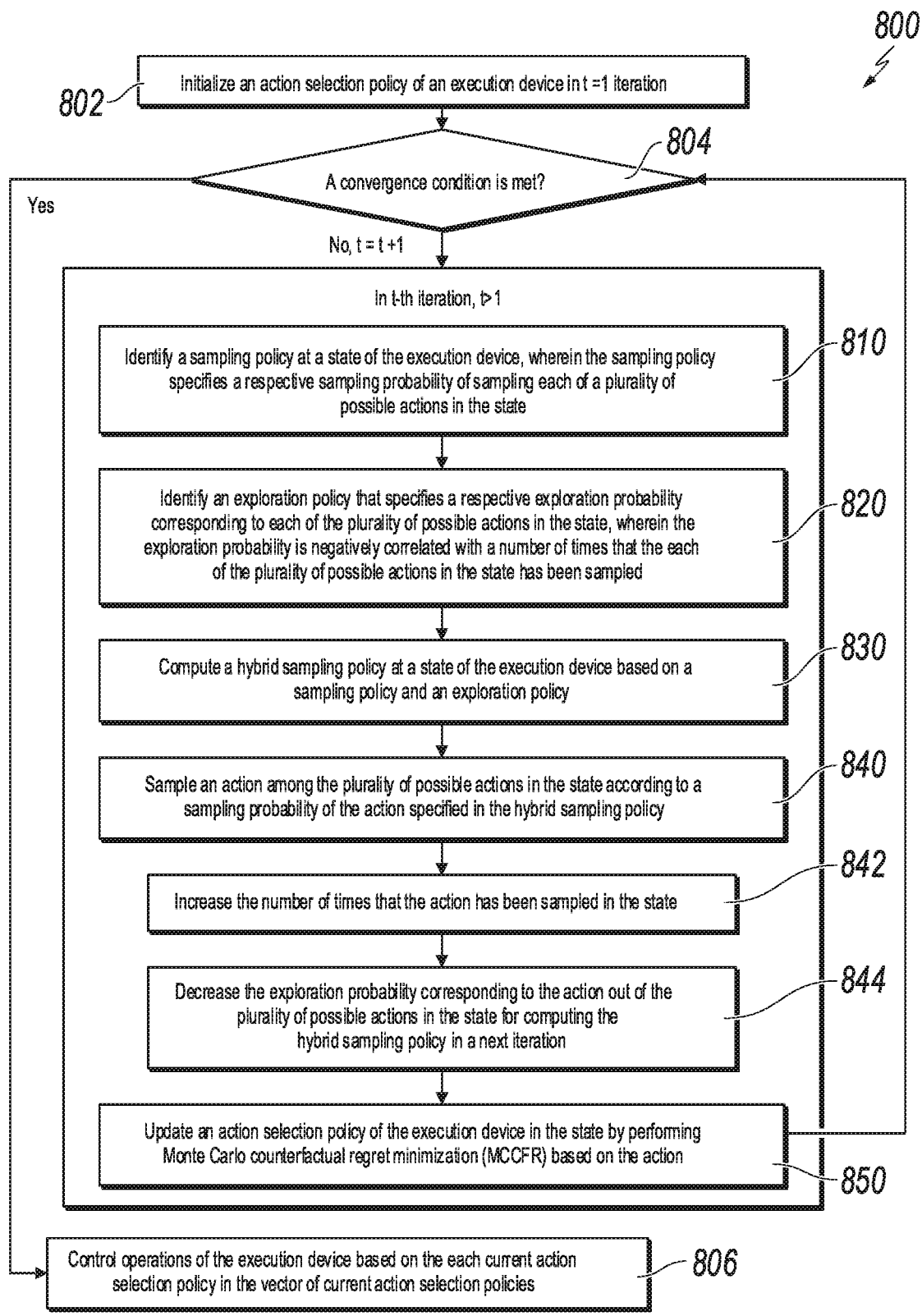
FIG. 8 is a flowchart of an example of another process for performing Monte Carlo counterfactual regret minimization (MCCFR) for determining action selection policies for software applications in accordance with embodiments of this specification.

FIG. 8 is a flowchart of an example of another process 800 for performing Monte Carlo counterfactual regret minimization (MCCFR) for determining action selection policies for software applications in accordance with embodiments of this specification. The process 800 can be an example of the MCCFR algorithm with a hybrid sampling scheme with exploration as described above. Note that the process 800 can be applied in value-form, semi-vector-form, and vector-form MCCFR. In some embodiments, the process 800 can be combined with the process 700, for example, by replacing the sampling policy in process 700 with the hybrid sampling policy in process 800.

The example process 800 shown in FIG. 8 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 8 can be executed as multiple separate operations, or one or more subsets of the operations shown in FIG. 8 can be combined and executed as a single operation.

In some embodiments, the process 800 can be performed in an iterative manner, for example, by performing two or more iterations. In some embodiments, the process 800 can be used in automatic control, robotics, or any other applications that involve action selections. In some embodiments, the process 800 can be performed by an execution device for generating an action selection policy (e.g., a strategy) for completing a task (e.g., finding Nash equilibrium) in an environment that includes the execution device and one or more other devices. In some embodiments, generating the action selection policy can include some or all operations of the process 800, for example, by initiating an action selection policy at 802 and updating the action selection policy at 850 over iterations. The execution device can perform the process 800 in the environment for controlling operations of the execution device according to the action selection policy.

In some embodiments, the execution device can include a data processing apparatus such as a system of one or more computers, located in one or more locations, and programmed appropriately in accordance with this specification. For example, a computer system 1000 of FIG. 10, appropriately programmed, can perform the process 800. The execution device can be associated with an execution party or player. The execution party or player and one or more other parties (e.g., associated with the one or more other devices) can be participants or players in an environment, for example, for strategy searching in strategic interaction between the execution party and one or more other parties.

In some embodiments, the environment can be modeled by an imperfect information game (IIG) that involves two or more players. In some embodiments, the process 800 can be performed for solving an IIG, for example, by the execution party supported by the application. The IIG can represent one or more real-world scenarios such as resource allocation, product/service recommendation, cyber-attack prediction and/or prevention, traffic routing, fraud management, etc., that involve two or more parties, where each party may have incomplete or imperfect information about the other party's decisions. As an example, the IIG can represent a collaborative product-service recommendation service that involves at least a first player and a second player. The first player may be, for example, an online retailer that has customer (or user) information, product and service information, purchase history of the customers, etc. The second player can be, for example, a social network platform that has social networking data of the customers, a bank or another financial institution that has financial information of the customers, a car dealership, or any other parties that may have information of the customers on the customers' preferences, needs, financial situations, locations, etc. in predicting and recommending products and services to the customers. The first player and the second player may each have proprietary data that the player does not want to share with others. The second player may only provide partial information to the first player at different times. As such, the first player may only have limited access to the information of the second player. In some embodiments, the process 800 can be performed for making a recommendation to a party with the limited information of the second party, planning a route with limited information.

At 802, similar to 702, an action selection policy (e.g., a strategy $\sigma_i^t$) in a first iteration, i.e., t=1 iteration, is initialized. In some embodiments, an action selection policy can include or otherwise specify a respective probability (e.g., $\sigma_i^t(a_j|I_i)$) of selecting an action (e.g., $a_j$) among a plurality of possible actions in a state (e.g., a current state i) of the execution device (e.g., the device of the execution device that perform the process 800). The current state results from a previous action taken by the execution device in a previous state, and each action of the plurality of possible actions leads to a respective next state if performed by the execution device when the execution device is in the current state.

In some embodiments, a state can be represented by a node of the game tree (e.g., a non-terminal node 123, 127, 143b, or 147b or a terminal node 143a, 153a, 153b, 143c, 143d, 147a, 157a, 157b, 147c, or 147d of the game tree 100). In some embodiments, the state can be a public state represented by a node of a public tree (e.g., a non-terminal node 125, 135a, 135b, or 145b, or a terminal node 145a, 145c, 145d, 155a, or 155b of the public tree 150).

In some embodiments, the strategy can be initialized, for example, based on an existing strategy, a uniform random strategy (e.g. a strategy based on a uniform probability distribution), or another strategy (e.g. a strategy based on a different probability distribution). For example, if the system warm starts from an existing CFR method (e.g., an original CFR or MCCFR method), the iterative strategy can be initialized from an existing strategy profile to clone existing regrets and strategy.

At 804, similar to 704, whether a convergence condition is met is determined. MCCFR typically includes multiple iterations. The convergence condition can be used for determining whether to continue or terminate the iteration. In some embodiments, the convergence condition can be based on exploitability of a strategy a. According to the definition of exploitability, exploitability should be larger than or equal to 0. The smaller exploitability indicates a better strategy. That is, the exploitability of converged strategy should approach 0 after enough iterations. For example, in poker, when the exploitability is less than 1, the time-average strategy is regarded as a good strategy and it is determined that the convergence condition is met. In some embodiments, the convergence condition can be based on a predetermined number of iterations. For example, in a small game, the iterations can be easily determined by the exploitability. That is, if exploitability is small enough, the process 800 can terminate. In a large game, the exploitability is intractable and typically a large parameter for iteration can be specified. After each iteration, a new strategy profile can be obtained, which is better than the old one. For example, in a large game, the process 800 can terminate after a sufficient number of iterations.

If the convergence condition is met, no further iteration is needed. The process 800 proceeds to 806, and operations of the execution device are controlled according to the action selection policy. For example, the action selection policy in the current iteration, or an average action selection policy across the t iterations can be output as control commands to control one or more of a direction, speed, distance, or other operation of an engine, motor, valve, actuator, accelerator, brake, or other device in an autonomous vehicle or other applications. If the convergence condition is not met, t is increased by 1, and the process 800 proceeds to a next iteration, wherein t>1.

In a current iteration (e.g., t-th iteration), at 810, a sampling policy in a state of the execution device is identified. The sampling policy specifies a respective sampling probability of sampling each of the plurality of possible actions in the state. In some embodiments, the sampling policy comprises a first probability distribution over the plurality of possible actions in the state. The sampling policy can be any one of the sample policies described with respect to FIG. 7. For example, the sampling policy can be one or more of a uniform sampling policy, a random sampling policy, a specified random policy, Random Current Strategy (RCS), Mean Current Strategy (MCS), Weighted Current Strategy (WCS), Weighted Average Strategy (WAS), or any other sampling policy. In some embodiments, the sampling policy in the state of the execution device is identified, for example, according to the example techniques described w.r.t. 730 of the process 700.

At 820, an exploration policy in the state of the execution device is identified. The exploration policy specifies a respective exploration probability corresponding to each of the plurality of possible actions in the state, wherein the exploration probability is negatively correlated with a number of times that the each of the plurality of possible actions in the state has been sampled. In some embodiments, the exploration policy comprises a second probability distribution over the plurality of possible actions in the state.

In some embodiments, the exploration policy in the state of the execution device is identified, for example, by computing the exploration probability of each of the plurality of possible actions according to Eq. (22), wherein i represents an identifier of the execution device (e.g., associated with player i); $I_t$ represents an information set of the state; $A(I_t)$ represents the plurality of possible actions in the state; a represents one of the plurality of possible actions in the state; t represents a current iteration; $C^t(a|I_t)$ represents a number of times that the action a has been sampled in the state up to the iteration t; and $\sigma_t^{e,t}(a|I_t)$ represents an exploration policy of exploring the action a at the state in iteration t; and β is a nonnegative real number.

At 830, a hybrid sampling policy is computed based on the sampling policy and the exploration policy. In some embodiments, computing a hybrid sampling policy based on a sampling policy and an exploration policy comprises: computing a probability of each of the plurality of possible actions in the state based on a weight sum of the sampling probability of each of the plurality of possible actions in the state and the exploration probability of each of the plurality of possible actions in the state. In some embodiments, computing a hybrid sampling policy based on a sampling policy and an exploration policy comprises computing a probability of each of the plurality of possible actions in the state according to Eq. (20), wherein $I_t$ represents an information set of the state; a represents one of the plurality of possible actions in the state; $\sigma_i^{se}(a|I_t)$ represents the hybrid sampling policy of sampling the action a in the state; $\sigma_i^s(a|I_t)$ represents the sampling policy of sampling the action a in the state; $\sigma_i^e(a|I_t)$ represents the exploration policy of exploring the action a in the state; and $\alpha \in [0,1]$ represents a factor that controls a weight of exploration.

At 840, an action among the plurality of possible actions in the state is sampled according to a sampling probability of the action specified in the hybrid sampling policy. For example, for player 1 at the node 135a of the game tree 150 in FIG. 1B, the hybrid sampling policy can include a hybrid sampling probability of sampling the action $A_{1a}$ among the two possible actions $A_{1a}$ and $A_{1b}$ in the state of the node 135a (say a probability of 0.2), and a hybrid sampling probability of sampling the action $A_{1b}$ among the two possible actions $A_{1a}$ and $A_{1b}$ in the state of the node 135a (say a probability of 0.8). The action $A_{1b}$ can be sampled with a higher probability of 0.8 at the node 135a than the action $A_{1a}$. The sampled action $A_{1b}$ can be used for updating an action selection policy for the next iteration.

At 842, in response to sampling the action out of the plurality of possible actions in the state according to the hybrid sampling policy, a number of times that the action has been sampled in the state is increased. In some embodiments, the number of times that the action has been sampled in the state comprises a number of times that the action has been sampled in the state up to the current iteration (e.g., $C^t(a|I_t)$).

At 844, the exploration probability corresponding to the action out of the plurality of possible actions in the state is decreased for computing the hybrid sampling policy in a next iteration (e.g., the (t+1)-th iteration) so that the action has a lower probability to be sampled in the next iteration. In some embodiments, the exploration policy in the state of the execution device is decreased w.r.t. the number of times that the action has been sampled in the state, for example, according to Eq. (22), or another function.

At 850, an action selection policy of the execution device in the state is updated based on the action (e.g., sampled action $A_{1b}$ in the example described in 840) by performing Monte Carlo counterfactual regret minimization (MCCFR) based on the action. The action selection policy specifies a respective probability of selecting an action among the plurality of possible actions in the state for completing the task in the environment. The action selection policy can be, for example, a current strategy of the execution device in the state. For example, in MCCFR, once an action is sampled according to the sampling policy, then the action selection policy can be updated based on one or more of a regret, CFV, and other values calculated based on the sampled action.

In some embodiments, updating the action selection policy of the execution device in the state based on the action comprises performing the MCCFR based on the action, for example, according to some or all of Eqs. (4)-(12). For example, performing Monte Carlo counterfactual regret minimization (MCCFR) based on the action comprises: calculating a probability of a sampled terminal sequence of actions (e.g. $q(z)=\Sigma_{j:z\in Q_j} q_{Q_j}$) based on a hybrid sampling probability of the action, the sampled terminal sequence of actions including the action and a terminal state for completing a task; calculating a sampled counterfactual value of the action based on the probability of the sampled terminal sequence of actions (e.g., according to Eq. (9)); calculating a regret value of the action based on the sampled counterfactual value of the action (e.g., according to some or all of Eqs. (10)-(12)); and updating the action selection policy of the execution device in the state based on the regret value of the action (e.g., according to regret matching based on Eq. (8) or regret matching+). In some embodiments, an average strategy $\bar{\sigma}_i^t$ after the current iteration can be computed, for example, according to Eq. (8).

After 850, the process 800 can go back to 804 to determine whether a convergence condition is met is determined. In some embodiments, in response to determining that the convergence condition is met, operations of the execution device are controlled based on the action selection policy. In some embodiments, in response to determining that the convergence condition is met, an average action selection policy across all iterations (e.g., from the first iteration to the current iteration) in each state can be computed. for example, according to Eq. (8). In some embodiments, the average action selection policy can serve as an output of the process 800, for example, as the computed Nash equilibrium.

In some embodiments, the action selection policy can serve as an output of the software-implemented application to automatically control the execution device's action at each state, for example, by selecting the action that has the highest probability among a plurality of possible actions based on the action selection policy. As an example, the environment comprises a traffic routing environment, the execution device supported by the application comprises a computer-assisted vehicle, the action selection policy comprises a route selection policy for controlling directions of the computer-assisted vehicle, and controlling operations of the execution device according to the action selection policy comprises controlling directions of the computer-assisted vehicle according to the route selection policy.

Figure 9:
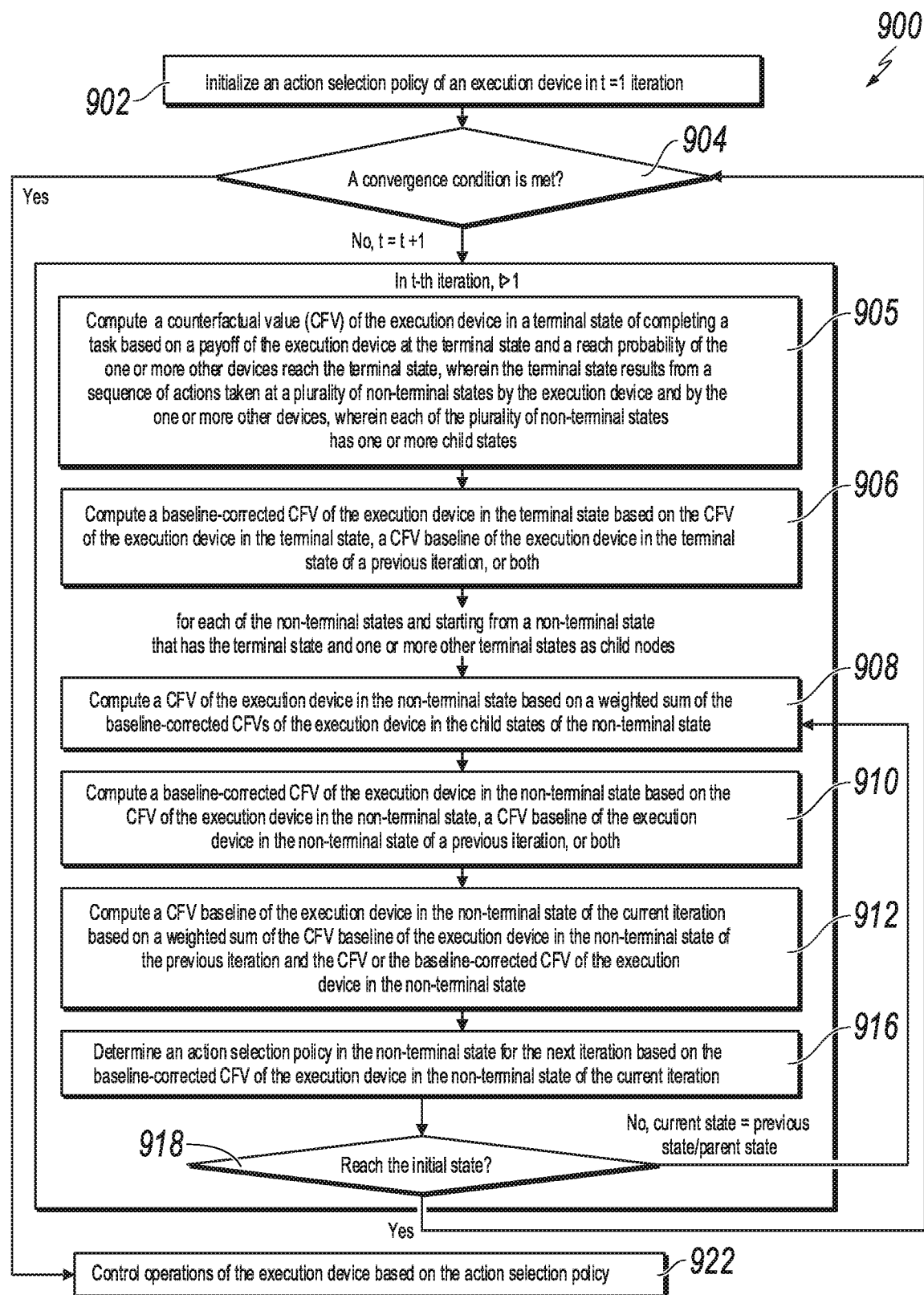
FIG. 9 is a flowchart of an example of another process for performing Monte Carlo counterfactual regret minimization (MCCFR) for determining action selection policies for software applications in accordance with embodiments of this specification.

FIG. 9 is a flowchart of an example of another process 900 for performing Monte Carlo counterfactual regret minimization (MCCFR) for determining action selection policies for software applications in accordance with embodiments of this specification. The process 900 can be an example of the MCCFR algorithm with variance reduction using a CFV baseline as described above. Note that the process 900 can be applied in value-form, semi-vector-form, and vector-form MCCFR. In some embodiments, the process 900 can be combined with the process 700 and/or process 800 to further improve convergence performance of the MCCFR.

The example process 900 shown in FIG. 9 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 9 can be executed as multiple separate operations, or one or more subsets of the operations shown in FIG. 9 can be combined and executed as a single operation.

In some embodiments, the process 900 can be performed in an iterative manner, for example, by performing two or more iterations. In some embodiments, the process 900 can be used in automatic control, robotics, or any other applications that involve action selections. In some embodiments, the process 900 can be performed by an execution device for generating an action selection policy (e.g., a strategy) for completing a task (e.g., finding Nash equilibrium) in an environment that includes the execution device and one or more other devices. In some embodiments, generating the action selection policy can include some or all operations of the process 900, for example, by initiating an action selection policy at 902 and updating the action selection policy at 916 over iterations. The execution device can perform the process 900 in the environment for controlling operations of the execution device according to the action selection policy.

In some embodiments, the execution device can include a data processing apparatus such as a system of one or more computers, located in one or more locations, and programmed appropriately in accordance with this specification. For example, a computer system 1000 of FIG. 10, appropriately programmed, can perform the process 900. The execution device can be associated with an execution party or player. The execution party or player and one or more other parties (e.g., associated with the one or more other devices) can be participants or players in an environment, for example, for strategy searching in strategic interaction between the execution party and one or more other parties.

In some embodiments, the environment can be modeled by an imperfect information game (IIG) that involves two or more players. In some embodiments, the process 900 can be performed for solving an IIG, for example, by the execution party supported by the application. The IIG can represent one or more real-world scenarios such as resource allocation, product/service recommendation, cyber-attack prediction and/or prevention, traffic routing, fraud management, etc., that involve two or more parties, where each party may have incomplete or imperfect information about the other party's decisions. As an example, the IIG can represent a collaborative product-service recommendation service that involves at least a first player and a second player. The first player may be, for example, an online retailer that has customer (or user) information, product and service information, purchase history of the customers, etc. The second player can be, for example, a social network platform that has social networking data of the customers, a bank or another financial institution that has financial information of the customers, a car dealership, or any other parties that may have information of the customers on the customers' preferences, needs, financial situations, locations, etc. in predicting and recommending products and services to the customers. The first player and the second player may each have proprietary data that the player does not want to share with others. The second player may only provide partial information to the first player at different times. As such, the first player may only have limited access to the information of the second player. In some embodiments, the process 900 can be performed for making a recommendation to a party with the limited information of the second party, planning a route with limited information.

At 902, similar to 702, an action selection policy (e.g., a strategy $\sigma_i^t$) in a first iteration, i.e., t=1 iteration, is initialized. In some embodiments, an action selection policy can include or otherwise specify a respective probability (e.g., $\sigma_i^t(a_j|I_i)$) of selecting an action (e.g., $a_j$) among a plurality of possible actions in a state (e.g., a current state i) of the execution device (e.g., the device of the execution device that perform the process 900). The current state results from a previous action taken by the execution device in a previous state, and each action of the plurality of possible actions leads to a respective next state if performed by the execution device when the execution device is in the current state.

In some embodiments, a state can be represented by a node of the game tree (e.g., a non-terminal node 123, 127, 143b, or 147b or a terminal node 143a, 153a, 153b, 143c, 143d, 147a, 157a, 157b, 147c, or 147d of the game tree 100). In some embodiments, the state can be a public state represented by a node of a public tree (e.g., a non-terminal node 125, 135a, 135b, or 145b, or a terminal node 145a, 145c, 145d, 155a, or 155b of the public tree 150).

In some embodiments, the strategy can be initialized, for example, based on an existing strategy, a uniform random strategy (e.g. a strategy based on a uniform probability distribution), or another strategy (e.g. a strategy based on a different probability distribution). For example, if the system warm starts from an existing CFR method (e.g., an original CFR or MCCFR method), the iterative strategy can be initialized from an existing strategy profile to clone existing regrets and strategy.

At 904, similar to 704, whether a convergence condition is met is determined. MCCFR typically includes multiple iterations. The convergence condition can be used for determining whether to continue or terminate the iteration. In some embodiments, the convergence condition can be based on exploitability of a strategy a. According to the definition of exploitability, exploitability should be larger than or equal to 0. The smaller exploitability indicates a better strategy. That is, the exploitability of converged strategy should approach 0 after enough iterations. For example, in poker, when the exploitability is less than 1, the time-average strategy is regarded as a good strategy and it is determined that the convergence condition is met. In some embodiments, the convergence condition can be based on a predetermined number of iterations. For example, in a small game, the iterations can be easily determined by the exploitability. That is, if exploitability is small enough, the process 900 can terminate. In a large game, the exploitability is intractable and typically a large parameter for iteration can be specified. After each iteration, a new strategy profile can be obtained, which is better than the old one. For example, in a large game, the process 900 can terminate after a sufficient number of iterations.

If the convergence condition is met, no further iteration is needed. The process 900 proceeds to 922, and operations of the execution device are controlled according to the action selection policy. In some embodiments, the action selection policy comprises an action selection policy of the execution device in the non-terminal state. In some embodiments, operations of the execution device are controlled according to the action selection policy comprises controlling operations of the execution device in the non-terminal state based on the action selection policy in the non-terminal state for the next iteration. In some embodiments, the action selection policy in the current iteration, or an average action selection policy across the t iterations can be output as control commands to control one or more of a direction, speed, distance, or other operation of an engine, motor, valve, actuator, accelerator, brake, or other device in an autonomous vehicle or other applications. If the convergence condition is not met, t is increased by 1, and the process 900 proceeds to a next iteration, wherein t>1.

In some embodiments, each iteration of the process 900 can include a bottom-up process for computing CFVs and updating action selection policies of different states. For example, the process 900 can start from terminal states (e.g., the leaf node or terminal node 143a, 153a, 153b, 143c, 143d, 147a, 157a, 157b, 147c, or 147d of the game tree 100 in FIG. 1A, or the terminal node 145a, 145c, 145d, 155a, or 155b of the public tree 150 in FIG. 1B) and move up to the initial state (e.g., the root node 110 of the game tree 100 in FIG. 1A or the root node 125 of the public tree 150 in FIG. 1B).

In a current iteration (e.g., t-th iteration), at 905, a counterfactual value (CFV) (e.g., $\tilde{v}_i^{\sigma^t}(I_i, a|Q_j)$) of the execution device in a terminal state of completing a task is computed based on a payoff of the execution device at the terminal state and a reach probability of the one or more other devices reaching the terminal state, for example, according to the upper (or first) equation of Eq. (18).

The terminal state (e.g., terminal node 155b in FIG. 1B) results from a sequence of actions (e.g., a sequence of actions $[A_{1a}, A_{2b}, A_{3b}]$) that includes actions taken at a plurality of non-terminal states (e.g., the non-terminal nodes 125, 135a, and 145b) by the execution device (e.g., $A_{1a}$ and $A_{3b}$) and by the one or more other devices (e.g., $A_{2b}$). In some embodiments, each of the plurality of non-terminal states has one or more child states. For example, the non-terminal nodes 125 has two child states, nodes 135a and 135b; the non-terminal nodes 135a has two child states, nodes 145a and 145b; and the non-terminal nodes 145b has two child states, nodes 155a and 155b.

In some embodiments, the reach probability of the one or more other devices reach the terminal state comprises a product of probabilities of actions taken by the one or more other devices reach the terminal state. For example, if the execution device corresponding to player 1, the reach probability of the one or more other devices (e.g., corresponding to player 2) reaching the terminal state (e.g., terminal node 155b) comprises a product of probabilities of actions (e.g., $A_{2b}$) taken by the one or more other devices reach the terminal state. If the execution device corresponding to player 2, the reach probability of the one or more other devices (e.g., corresponding to player 1) reaching the terminal state (e.g., terminal node 155b) comprises a product of probabilities of actions (e.g., $A_{1a}$ and $A_{3b}$) taken by the one or more other devices that reach the terminal state.

At 906, a baseline-corrected CFV (e.g., $\hat{v}_i^{\sigma^t}(I_i, a|Q_j)$) of the execution device in the terminal state is computed based on the CFV of the execution device in the terminal state, a CFV baseline of the execution device in the terminal state of a previous iteration, or both, for example, according to Eq. (17). For example, a sampled CFV baseline of the execution device (e.g., $\tilde{b}_i^{t-1}(a|I_i)$) that takes the action in the terminal state of the previous iteration is computed based on the CFV baseline of the execution device in the terminal state of the previous iteration, a sampling policy of the execution device that takes the action in the terminal state of the previous iteration, and a probability of reaching the terminal state results from a sequence of actions taken by the execution device, for example, according to Eq. (16). In response to determining that the action is sampled, a baseline-corrected CFV of the execution device (e.g., $\tilde{v}_i^{\sigma^t}(I_i, a|Q_j)$) that takes the action in the non-terminal state is computed based on the CFV of the execution device in the non-terminal state and the sampled CFV baseline of the execution device that takes the action in the terminal state of the previous iteration, for example, according to the lower (or second) equation of Eq. (17). In response to determining that the action is not sampled, the sampled CFV baseline of the execution device that takes the action in the terminal state of the previous iteration is used as the baseline-corrected CFV of the execution device in the non-terminal state, for example, according to the top (or first) equation of Eq. (17).

In some embodiments, for each of the non-terminal states and starting from a non-terminal state that has the terminal state and one or more other terminal states as child states, at 908, a CFV of the execution device in the non-terminal state (e.g., estimate counterfactual value $\tilde{v}_i^{\sigma^t}(I_i, a|Q_j)$) is computed based on a weighted sum of the baseline-corrected CFVs of the execution device in the child states of the non-terminal state. In some embodiments, the weighted sum of the baseline-corrected CFV of the execution device in the terminal state and corresponding baseline-corrected CFVs of the execution device in the one or more other terminal states is computed based on the baseline-corrected CFV of the execution device in the terminal state and corresponding baseline-corrected CFVs of the execution device in the one or more other terminal states weighted by an action selection policy in the non-terminal state in the current iteration, for example, according to the lower (or second) equation of Eq. (18).

At 910, a baseline-corrected CFV (e.g., $\hat{v}_i^{\sigma^t}(I_i, a|Q_j)$) of the execution device in the non-terminal state is computed based on the CFV of the execution device in the non-terminal state, a CFV baseline of the execution device in the non-terminal state of a previous iteration, or both, for example, according to Eq. (17) similar to the techniques described w.r.t. 906.

At 912, a CFV baseline (e.g., $b_i^t(a|I_i)$) of the execution device in the non-terminal state of the current iteration is computed based on a weighted sum of the CFV baseline of the execution device in the non-terminal state of the previous iteration and the CFV (e.g., $\tilde{v}_i^{\sigma^t}(I_i, a|Q_j)$) or the baseline-corrected CFV (e.g., $\hat{v}_i^{\sigma^t}(I_i, a|Q_j)$) of the execution device in the non-terminal state, for example, according to Eq. (19). In some embodiments, the weighted sum of the CFV baseline of the execution device in the non-terminal state of the previous iteration and the CFV or the baseline-corrected CFV of the execution device in the non-terminal state comprises a sum of the CFV baseline of the execution device in the non-terminal state of the previous iteration weighted by a scalar (e.g., $(1-\gamma)$); and the CFV or the baseline-corrected CFV of the execution device in the non-terminal state weighted by a second scalar (e.g., $(\gamma)$) and a probability of considering the non-terminal state (e.g., $q(I_i)$, for example, according to the lower (or second) equation of Eq. (19).

At 916, an action selection policy in the non-terminal state for the next iteration is determined based on the baseline-corrected CFV of the execution device in the non-terminal state of the current iteration. In some embodiments, the baseline-corrected CFV of each node can be used to compute the regret, cumulative regret, current strategy, and average strategy, for example, according to Eqs. (10), (12), (7) and (8), respectively. In some embodiments, determining an action selection policy in the non-terminal state for the next iteration based on the baseline-corrected CFV of the execution device in the non-terminal state of the current iteration comprises: calculating a regret value based on the baseline-corrected CFV of the execution device in the non-terminal state of the current iteration (e.g., according to some or all of Eqs. (10)-(12)); and determining an action selection policy in the non-terminal state for the next iteration based on the regret value according to regret matching (e.g., according to regret matching based on Eq. (8) or regret matching+). In some embodiments, an average strategy $\bar{\sigma}_i^t$ after the current iteration can be computed, for example, according to Eq. (8).

At 918, whether the current state is the initial state is determined. In some embodiments, such a determination can be used for determining whether to continue or terminate updating the baseline-corrected CFV of the states in the current iteration. If the current state is the initial state, no further updating of the baseline-corrected CFV is needed. The process 900 goes to a next iteration to 904. If the current state is not the initial state, a previous or parent state of the state (e.g., a parent node of the current node in a game tree or public tree) is used to replace the current state, and the process 900 goes back to 908 to obtain a CFV for each action of the previous state. The process 900 can continue as shown in FIG. 9.

In some embodiments, as described above, for each iteration of the process 900, only the terminal states would require computing the counterfactual value (e.g., $\tilde{v}_i^{\sigma^t}(I_i, a|Q_j)$) based on a multiplication of a payoff of the execution device at the terminal state and a reach probability of the one or more other devices reaching the terminal state (e.g., for example, according to the upper (or first) equation of Eq. (18). For non-terminal states, the counterfactual values and/or baseline-enhanced counterfactual values can be computed based on weighted sums of the counterfactual values and/or baseline-enhanced counterfactual values of the terminal states because the baseline are based on the counterfactual values, rather than the expected utility values. As such, compared to variance-reduction techniques using expected utility value baselines that compute the counterfactual value based on an utility value matrix of player i and the opponent's range matrix (i.e., the reach probability of the opponent), for example, according to Eq. (4), the process 900 can reduce the computational load and improve the computational efficiency. In some embodiments, the computational load saved by the counterfactual value baseline relative to expected utility value baseline can depend on a depth of and/or a number of non-terminal states in the game tree or public tree that represents the environment or the IIG.

Figure 10:
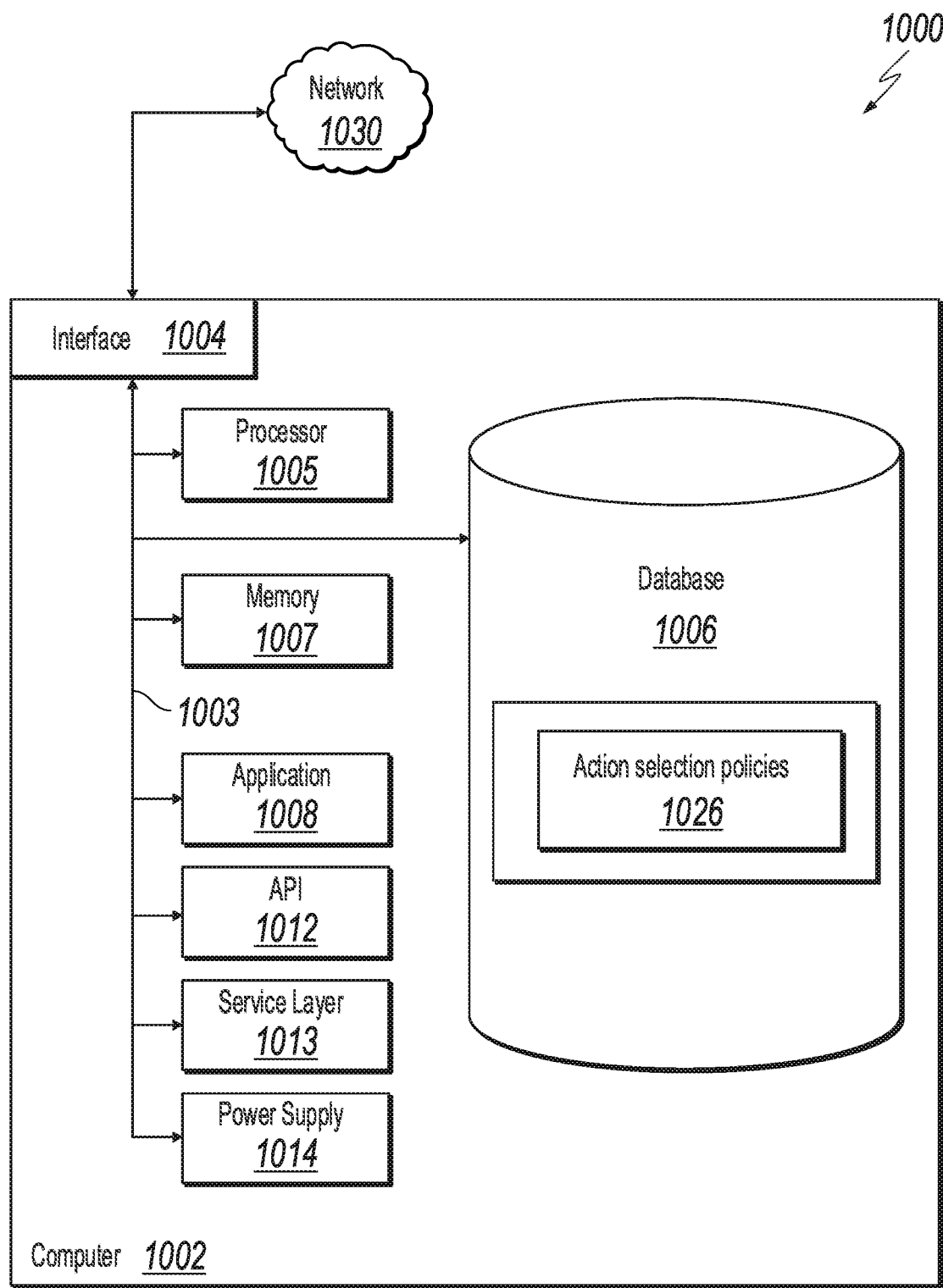
FIG. 10 depicts a block diagram illustrating an example of a computer-implemented system used to provide computational functionalities associated with described algorithms, methods, functions, processes, flows, and procedures in accordance with embodiments of this specification.

FIG. 10 depicts a block diagram illustrating an example of a computer-implemented system used to provide computational functionalities associated with described algorithms, methods, functions, processes, flows, and procedures in accordance with embodiments of this specification. FIG. 10 is a block diagram illustrating an example of a computer-implemented System 1000 used to provide computational functionalities associated with described algorithms, methods, functions, processes, flows, and procedures, according to an embodiment of the present disclosure. In the illustrated embodiment, System 1000 includes a Computer 1002 and a Network 1030.

The illustrated Computer 1002 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device.

Additionally, the Computer 1002 can include an input device, such as a keypad, keyboard, touch screen, another input device, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as a client, network component, a server, a database or another persistency, another role, or a combination of roles for performing the subject matter described in the present disclosure. The illustrated Computer 1002 is communicably coupled with a Network 1030. In some embodiments, one or more components of the Computer 1002 can be configured to operate within an environment, including cloud-computing-based, local, global, another environment, or a combination of environments.

At a high level, the Computer 1002 is an electronic computing device operable to receive, transmit, process, store, or manage data and information associated with the described subject matter. According to some embodiments, the Computer 1002 can also include or be communicably coupled with a server, including an application server, e-mail server, web server, caching server, streaming data server, another server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some embodiments, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1002, alternative embodiments can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular embodiments of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular embodiments of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory, conventional, or another type of database storing data consistent with the present disclosure. In some embodiments, Database 1006 can be a combination of two or more different database types (for example, a hybrid in-memory and conventional database) according to particular needs, desires, or particular embodiments of the Computer 1002 and the described functionality. Although illustrated as a single Database 1006, two or more databases of similar or differing types can be used according to particular needs, desires, or particular embodiments of the Computer 1002 and the described functionality. While Database 1006 is illustrated as an integral component of the Computer 1002, in alternative embodiments, Database 1006 can be external to the Computer 1002. As an example, Database 1006 can include the above-described action selection policies (strategies) 1026, for example, for computing an accumulative and/or average action selection (strategy).

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some embodiments, Memory 1007 can be a combination of two or more different types of memory (for example, a combination of semiconductor and magnetic storage) according to particular needs, desires, or particular embodiments of the Computer 1002 and the described functionality. Although illustrated as a single Memory 1007, two or more Memories 1007 or similar or differing types can be used according to particular needs, desires, or particular embodiments of the Computer 1002 and the described functionality. While Memory 1007 is illustrated as an integral component of the Computer 1002, in alternative embodiments, Memory 1007 can be external to the Computer 1002.

The Application 1008 is an algorithmic software engine providing functionality according to particular needs, desires, or particular embodiments of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative embodiments, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some embodiments, the Power Supply 1014 can include power-conversion or management circuits (including recharging, standby, or another power management functionality). In some embodiments, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Figure 11:
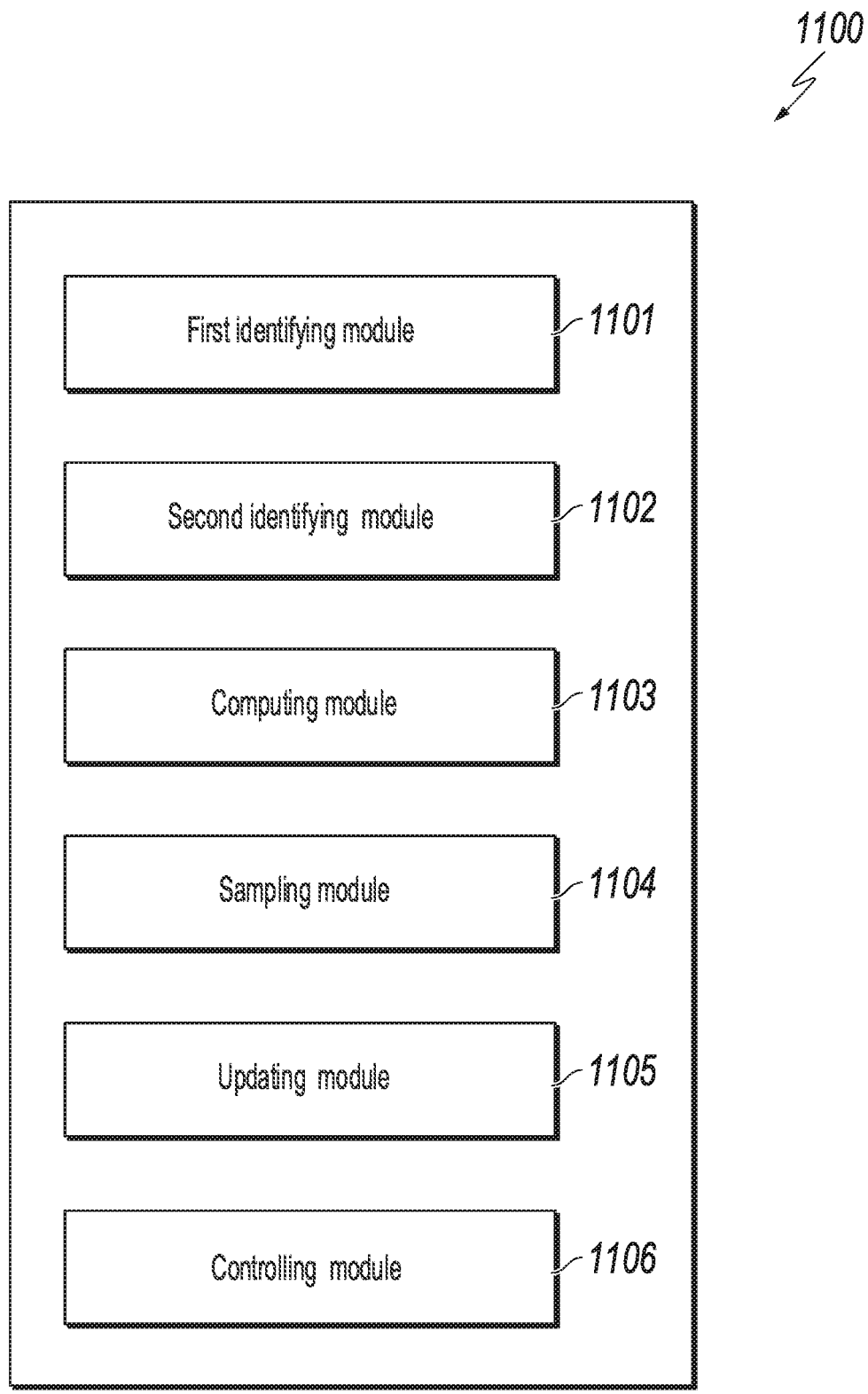
FIG. 11 depicts examples of modules of an apparatus in accordance with embodiments of this specification.

FIG. 11 is a diagram of an example of modules of an apparatus 1100 in accordance with embodiments of this specification. The apparatus 1100 can be an example embodiment of a data processing apparatus or an execution device for generating an action selection policy for completing a task in an environment that includes the execution device and one or more other devices. The apparatus 1100 can correspond to the embodiments described above, and the apparatus 1100 includes the following: a first identifying module 1101 for identifying a plurality of possible actions in a state, wherein the state corresponds to a vector of information sets, and each information set in the vector of information sets comprises a sequence of actions taken by the execution device that leads to the state; a second identifying module 1102 for identifying a vector of current action selection policies in the state, wherein each current action selection policy in the vector of current action selection policies corresponds to an information set in the vector of information sets, and the action selection policy specifies a respective probability of selecting an action among the plurality of possible actions in the state; a computing module 1103 for computing a sampling policy based on the vector of current action selection policies in the state, wherein the sampling policy specifies a respective sampling probability corresponding to each of the plurality of possible actions in the state; a sampling module 1104 for sampling an action among the plurality of possible actions in the state according to a sampling probability of the action specified in the sampling policy; and an updating module 1105 for updating the each current action selection policy in the vector of current action selection policies of the execution device in the state based on the action.

In some embodiments, the apparatus 1100 further includes the following: a controlling module 1106 for controlling operations of the execution device based on the action selection policy in response to determining that a convergence condition is met.

In some embodiments, wherein updating the each current action selection policy in the vector of current action selection policies of the execution device in the state based on the action comprises performing Monte Carlo counterfactual regret minimization (MCCFR) based on the action.

In some embodiments, wherein updating the each current action selection policy in the vector of current action selection policies of the execution device in the state based on the action comprises: calculating a probability of a sampled terminal sequence of actions based on the sampling probability of the action, the sampled terminal sequence of actions including the action and a terminal state for completing a task; calculating a sampled counterfactual value of the action based on the probability of the sampled terminal sequence of actions; calculating a regret value of the action based on the sampled counterfactual value of the action; and updating the each of the vector of current action selection policies of the execution device in the state based on the regret value of the action.

In some embodiments, wherein the state corresponds to a public sequence that comprises one or more actions publically known by the execution device and the one or more other devices; and the each information set in the vector of information sets comprises the public sequence.

In some embodiments, wherein computing a sampling policy based on the vector of current action selection policies of the execution device in the state comprises: computing the sampling probability corresponding to each of the plurality of possible actions in the state as a mean value of current action selection policies of each of the plurality of possible actions in the state over the vector of information sets.

In some embodiments, wherein computing a sampling policy based on the vector of current action selection policies of the execution device in the state comprises: computing the sampling probability corresponding to each of the plurality of possible actions in the state based on current action selection policies of each of the plurality of possible actions in the state and respective reach probabilities of the vector of information sets.

In some embodiments, wherein computing the sampling probability corresponding to each of the plurality of possible actions in the state based on current action selection policies of each of the plurality of possible actions in the state and respective reach probabilities of the vector of information sets comprises: computing the sampling probability corresponding to each of the plurality of possible actions in the state based on a sum of the current action selection policies of each of the plurality of possible actions in the state weighted by the respective reach probabilities of the vector of information sets.

In some embodiments, wherein computing a sampling policy based on the vector of current action selection policies of the execution device in the state comprises: computing the sampling probability corresponding to each of the plurality of possible actions in the state based on average action selection policies of each of the plurality of possible actions in the state and respective reach probabilities of the vector of information sets.

In some embodiments, wherein computing the sampling probability corresponding to each of the plurality of possible actions in the state based on average action selection policies of each of the plurality of possible actions in the state and respective reach probabilities of the vector of information sets comprises: computing the sampling probability corresponding to each of the plurality of possible actions in the state based on a sum of the average action selection policies of each of the plurality of possible actions in the state weighted by the respective reach probabilities of the vector of information sets.

Figure 12:
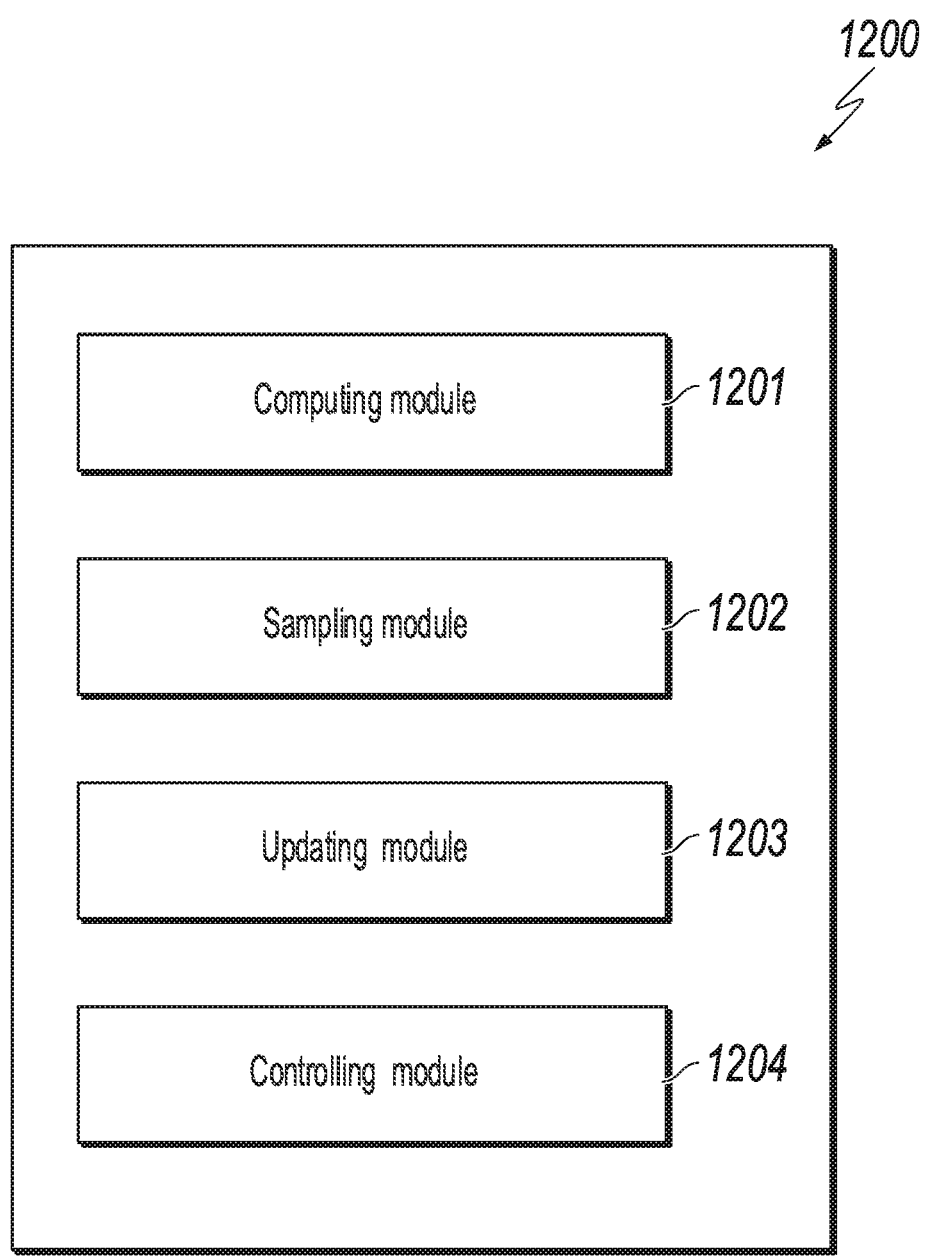
FIG. 12 depicts examples of modules of another apparatus in accordance with embodiments of this specification.

FIG. 12 is a diagram of an example of modules of an apparatus 1200 in accordance with embodiments of this specification. The apparatus 1200 can be an example embodiment of a data processing apparatus or an execution device for generating an action selection policy for completing a task in an environment that includes the execution device and one or more other devices. The apparatus 1200 can correspond to the embodiments described above, and the apparatus 1200 includes the following: a computing module 1201 for computing a hybrid sampling policy at a state of the execution device based on a sampling policy and an exploration policy, wherein the state corresponds to a plurality of possible actions that lead to respective next states if performed by the execution device when the execution device is in the state, wherein the sampling policy specifies a respective sampling probability of sampling each of the plurality of possible actions in the state, wherein the exploration policy specifies a respective exploration probability corresponding to each of the plurality of possible actions in the state, wherein the exploration probability is negatively correlated with a number of times that the each of the plurality of possible actions in the state has been sampled; a sampling module 1202 for sampling an action among the plurality of possible actions in the state according to a sampling probability of the action specified in the hybrid sampling policy; and an updating module 1203 for updating an action selection policy of the execution device in the state by performing Monte Carlo counterfactual regret minimization (MCCFR) based on the action, wherein the action selection policy specifies a respective probability of selecting an action among the plurality of possible actions in the state for completing the task in the environment.

In some embodiments, the apparatus 1200 further includes the following: a controlling module 1204 for controlling operations of the execution device based on the action selection policy in response to determining that a convergence condition is met.

In some embodiments, the apparatus 1200 further includes the following: an increasing module for increasing a number of times that the action has been sampled in the state; and a decreasing module for decreasing the exploration probability corresponding to the action out of the plurality of possible actions in the state for computing the hybrid sampling policy in a next iteration, in response to sampling the action out of the plurality of possible actions in the state according to the hybrid sampling policy.

In some embodiments, wherein performing Monte Carlo counterfactual regret minimization (MCCFR) based on the action comprises: calculating a probability of a sampled terminal sequence of actions based on a hybrid sampling probability of the action, the sampled terminal sequence of actions including the action and a terminal state for completing a task; calculating a sampled counterfactual value of the action based on the probability of the sampled terminal sequence of actions; calculating a regret value of the action based on the sampled counterfactual value of the action; and updating the action selection policy of the execution device in the state based on the regret value of the action.

In some embodiments, wherein: the sampling policy comprises a first probability distribution over the plurality of possible actions in the state, and the exploration policy comprises a second probability distribution over the plurality of possible actions in the state.

In some embodiments, wherein computing a hybrid sampling policy based on a sampling policy and an exploration policy comprises: computing a probability of each of the plurality of possible actions in the state based on a weight sum of the sampling probability of each of the plurality of possible actions in the state and the exploration probability of each of the plurality of possible actions in the state.

In some embodiments, wherein computing a hybrid sampling policy based on a sampling policy and an exploration policy comprises: computing a probability of each of the plurality of possible actions in the state according to:

$$\sigma_i^{se}(a|I_i) = (1-\alpha) * \sigma_i^s(a|I_i) + \alpha * \sigma_i^e(a|I_i),$$

wherein: L represents an information set of the state; a represents one of the plurality of possible actions; $\sigma_i^{se}(a|I_i)$ represents a hybrid sampling policy of sampling the action a in the state; $\sigma_i^s(a|I_i)$ represents a sampling policy of sampling the action a in the state; $\sigma_i^e(a|I_i)$ represents an exploration policy of exploring the action a in the state; and $\alpha \in [0,1]$ represents a factor that controls a weight of exploration.

In some embodiments, wherein the exploration probability of each of the plurality of possible actions in the state is computed according to:

$$\sigma_i^{e,t}(a|I_i) = \frac{\left(1 + \frac{\beta}{\sqrt{c^t(a|I_i)}}\right)}{\sum_{a \in A(I_i)}\left(1 + \frac{\beta}{\sqrt{c^t(a|I_i)}}\right)},$$

wherein: i represents an identifier of the execution device; $I_i$ represents an information set of the state; $A(I_i)$ represents the plurality of possible actions in the state; a represents one of the plurality of possible actions in the state; t represents a current iteration; $C^t(a|I_i)$ represents a number of times that the action a has been sampled in the state up to the current iteration t; $\sigma_i^{e,t}(a|I_i)$ represents an exploration policy of exploring the action a at the state in the current iteration t; and $\beta$ is a nonnegative real number.

Figure 13:
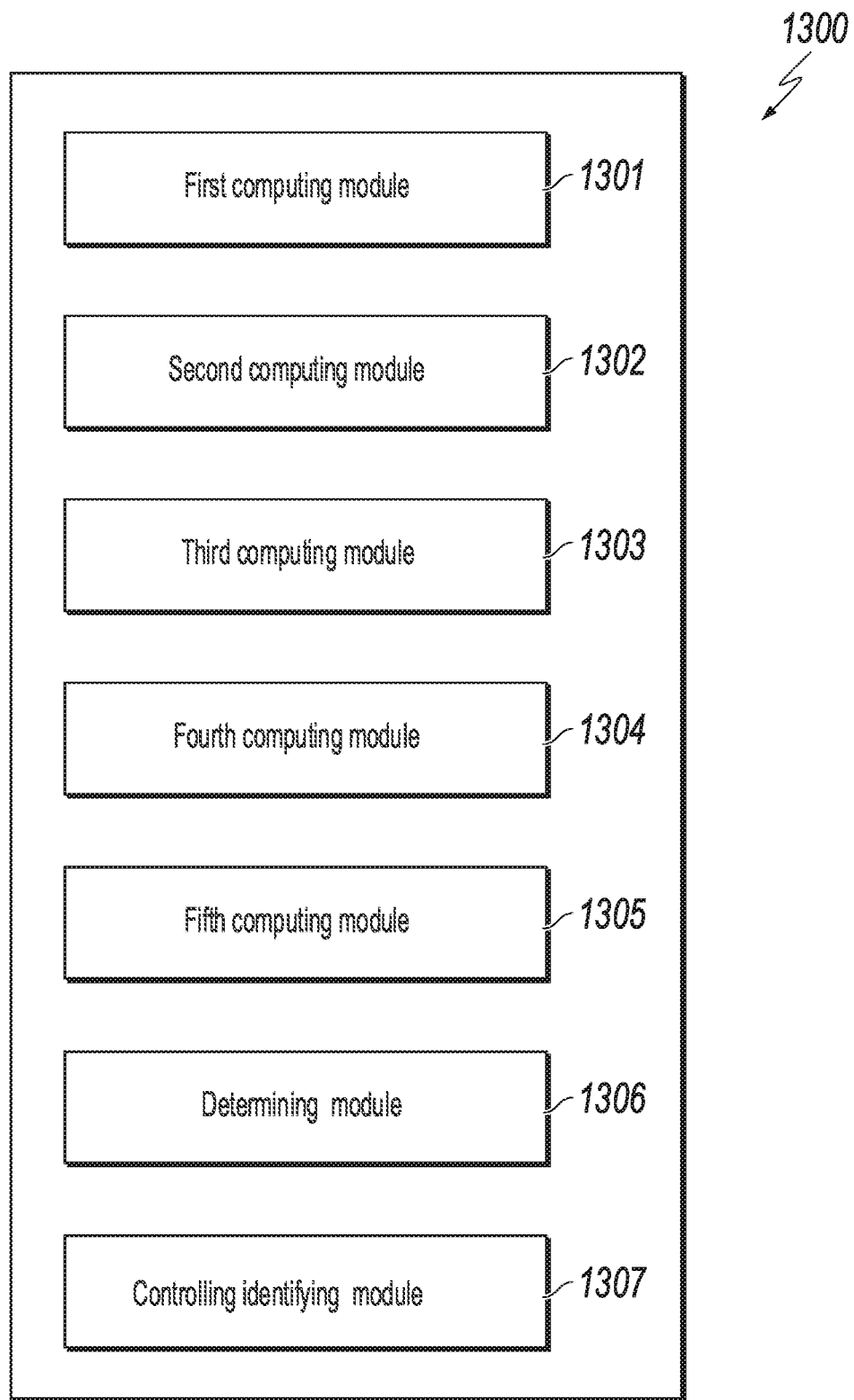
FIG. 13 depicts examples of modules of another apparatus in accordance with embodiments of this specification.

FIG. 13 is a diagram of an example of modules of an apparatus 1300 in accordance with embodiments of this specification. The apparatus 1300 can be an example embodiment of a data processing apparatus or an execution device for generating an action selection policy for completing a task in an environment that includes the execution device and one or more other devices. The apparatus 1300 can correspond to the embodiments described above, and the apparatus 1300 includes the following: for in a current iteration of a plurality of iterations, a first computing module 1301 for computing a counterfactual value (CFV) of the execution device in a terminal state of completing a task based on a payoff of the execution device at the terminal state and a reach probability of the one or more other devices reaching the terminal state, wherein the terminal state results from a sequence of actions taken at a plurality of non-terminal states by the execution device and by the one or more other devices, wherein each of the plurality of non-terminal states has one or more child states; a second computing module 1302 for computing a baseline-corrected CFV of the execution device in the terminal state based on the CFV of the execution device in the terminal state, a CFV baseline of the execution device in the terminal state of a previous iteration, or both; for each of the non-terminal states and starting from a non-terminal state that has the terminal state and one or more other terminal states as child states: a third computing module 1303 for computing a CFV of the execution device in the non-terminal state based on a weighted sum of the baseline-corrected CFVs of the execution device in the child states of the non-terminal state; a fourth computing module 1304 for computing a baseline-corrected CFV of the execution device in the non-terminal state based on the CFV of the execution device in the non-terminal state, a CFV baseline of the execution device in the non-terminal state of a previous iteration, or both; a fifth computing module 1305 for computing a CFV baseline of the execution device in the non-terminal state of the current iteration based on a weighted sum of the CFV baseline of the execution device in the non-terminal state of the previous iteration and the CFV or the baseline-corrected CFV of the execution device in the non-terminal state; and a determining module 1306 for determining an action selection policy in the non-terminal state for the next iteration based on the baseline-corrected CFV of the execution device in the non-terminal state of the current iteration.

In some embodiments, the apparatus 1300 further includes the following: a controlling identifying module 1307 for controlling operations of the execution device in the non-terminal state based on the action selection policy in the non-terminal state for the next iteration in response to determining that a convergence condition is met.

In some embodiments, wherein determining an action selection policy in the non-terminal state for the next iteration based on the baseline-corrected CFV of the execution device in the non-terminal state of the current iteration comprises: calculating a regret value based on the baseline-corrected CFV of the execution device in the non-terminal state of the current iteration; and determining an action selection policy in the non-terminal state for the next iteration based on the regret value according to regret matching.

In some embodiments, wherein the reach probability of the one or more other devices reaching the terminal state comprises a product of probabilities of actions taken by the one or more other devices reach the terminal state.

In some embodiments, wherein computing a baseline-corrected CFV of the execution device in the non-terminal state based on the CFV of the execution device in the non-terminal state, a CFV baseline of the execution device in the non-terminal state of a previous iteration, or both comprises: computing a sampled CFV baseline of the execution device that takes the action in the terminal state of the previous iteration based on the CFV baseline of the execution device in the terminal state of the previous iteration, a sampling policy of the execution device that takes the action in the terminal state of the previous iteration, and a probability of reaching the terminal state results from a sequence of actions taken by the execution device; in response to determining that the action is sampled, computing a baseline-corrected CFV of the execution device that takes the action in the non-terminal state based on the CFV of the execution device in the non-terminal state and the sampled CFV baseline of the execution device that takes the action in the terminal state of the previous iteration; and in response to determining that the action is not sampled, using the sampled CFV baseline of the execution device that takes the action in the terminal state of the previous iteration as the baseline-corrected CFV of the execution device in the non-terminal state.

In some embodiments, wherein the weighted sum of the baseline-corrected CFV of the execution device in the terminal state and corresponding baseline-corrected CFVs of the execution device in the one or more other terminal states is computed based on the baseline-corrected CFV of the execution device in the terminal state and corresponding baseline-corrected CFVs of the execution device in the one or more other terminal states weighted by an action selection policy in the non-terminal state in the current iteration.

In some embodiments, wherein the weighted sum of the CFV baseline of the execution device in the non-terminal state of the previous iteration and the CFV or the baseline-corrected CFV of the execution device in the non-terminal state comprises a sum of: the CFV baseline of the execution device in the non-terminal state of the previous iteration weighted by a scalar; and the CFV or the baseline-corrected CFV of the execution device in the non-terminal state weighted by a second scalar and a probability of considering the non-terminal state.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIGS. 11-13, each of the figures can be interpreted as illustrating an internal functional module and a structure of a data processing apparatus or an execution device for generating an action selection policy for completing a task in an environment that includes the execution device and one or more other devices. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., an LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet.

Also, a computer can interact with a user by sending text messages or other forms of messages to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method of an execution device for generating an action selection policy for completing a task in an environment that includes the execution device and one or more other devices, the method comprising:

identifying, by the execution device, a plurality of possible actions in a state, wherein the state corresponds to a vector of information sets, and each information set in the vector of information sets comprises a sequence of actions taken by the execution device that leads to the state;

identifying, by the execution device, a vector of current action selection policies in the state, wherein each current action selection policy in the vector of current action selection policies corresponds to an information set in the vector of information sets, and the action selection policy specifies a respective probability of selecting an action among the plurality of possible actions in the state;

computing, by the execution device, a sampling policy based on the vector of current action selection policies in the state, wherein the sampling policy specifies a respective sampling probability corresponding to each of the plurality of possible actions in the state;

sampling, by the execution device, an action among the plurality of possible actions in the state according to a sampling probability of the action specified in the sampling policy; and updating, by the execution device, the each current action selection policy in the vector of current action selection policies of the execution device in the state based on the action.

2. The computer-implemented method of claim 1, further comprising, in response to determining that a convergence condition is met, controlling operations of the execution device based on the action selection policy.

3. The computer-implemented method of claim 1, wherein updating the each current action selection policy in the vector of current action selection policies of the execution device in the state based on the action comprises performing Monte Carlo counterfactual regret minimization (MCCFR) based on the action.

4. The computer-implemented method of claim 1, wherein updating the each current action selection policy in the vector of current action selection policies of the execution device in the state based on the action comprises:

calculating a probability of a sampled terminal sequence of actions based on the sampling probability of the action, the sampled terminal sequence of actions including the action and a terminal state for completing a task;

calculating a sampled counterfactual value of the action based on the probability of the sampled terminal sequence of actions;

calculating a regret value of the action based on the sampled counterfactual value of the action; and updating the each of the vector of current action selection policies of the execution device in the state based on the regret value of the action.

5. The computer-implemented method of claim 1, wherein the state corresponds to a public sequence that comprises one or more actions publically known by the execution device and the one or more other devices; and the each information set in the vector of information sets comprises the public sequence.

6. The computer-implemented method of claim 1, wherein computing a sampling policy based on the vector of current action selection policies of the execution device in the state comprises:

computing the sampling probability corresponding to each of the plurality of possible actions in the state as a mean value of current action selection policies of each of the plurality of possible actions in the state over the vector of information sets.

7. The computer-implemented method of claim 1, wherein computing a sampling policy based on the vector of current action selection policies of the execution device in the state comprises:
computing the sampling probability corresponding to each of the plurality of possible actions in the state based on current action selection policies of each of the plurality of possible actions in the state and respective reach probabilities of the vector of information sets.

8. The computer-implemented method of claim 7, wherein computing the sampling probability corresponding to each of the plurality of possible actions in the state based on current action selection policies of each of the plurality of possible actions in the state and respective reach probabilities of the vector of information sets comprises:
computing the sampling probability corresponding to each of the plurality of possible actions in the state based on a sum of the current action selection policies of each of the plurality of possible actions in the state weighted by the respective reach probabilities of the vector of information sets.

9. The computer-implemented method of claim 1, wherein computing a sampling policy based on the vector of current action selection policies of the execution device in the state comprises:
computing the sampling probability corresponding to each of the plurality of possible actions in the state based on average action selection policies of each of the plurality of possible actions in the state and respective reach probabilities of the vector of information sets.

10. The computer-implemented method of claim 9, wherein computing the sampling probability corresponding to each of the plurality of possible actions in the state based on average action selection policies of each of the plurality of possible actions in the state and respective reach probabilities of the vector of information sets comprises:
computing the sampling probability corresponding to each of the plurality of possible actions in the state based on a sum of the average action selection policies of each of the plurality of possible actions in the state weighted by the respective reach probabilities of the vector of information sets.

11. A non-transitory, computer-readable medium storing one or more instructions executable by a computer system to perform operations comprising:
identifying a plurality of possible actions in a state, wherein the state corresponds to a vector of information sets, and each information set in the vector of information sets comprises a sequence of actions taken by an execution device that leads to the state;
identifying a vector of current action selection policies in the state, wherein each current action selection policy in the vector of current action selection policies corresponds to an information set in the vector of information sets, and an action selection policy specifies a respective probability of selecting an action among the plurality of possible actions in the state;
computing a sampling policy based on the vector of current action selection policies in the state, wherein the sampling policy specifies a respective sampling probability corresponding to each of the plurality of possible actions in the state;
sampling an action among the plurality of possible actions in the state according to a sampling probability of the action specified in the sampling policy; and
updating the each current action selection policy in the vector of current action selection policies of the execution device in the state based on the action.

12. The non-transitory, computer-readable medium of claim 11, further comprising, in response to determining that a convergence condition is met, controlling operations of the execution device based on the action selection policy.

13. The non-transitory, computer-readable medium of claim 11, wherein updating the each current action selection policy in the vector of current action selection policies of the execution device in the state based on the action comprises performing Monte Carlo counterfactual regret minimization (MCCFR) based on the action.

14. The non-transitory, computer-readable medium of claim 11, wherein updating the each current action selection policy in the vector of current action selection policies of the execution device in the state based on the action comprises:
calculating a probability of a sampled terminal sequence of actions based on the sampling probability of the action, the sampled terminal sequence of actions including the action and a terminal state for completing a task;
calculating a sampled counterfactual value of the action based on the probability of the sampled terminal sequence of actions;
calculating a regret value of the action based on the sampled counterfactual value of the action; and
updating the each of the vector of current action selection policies of the execution device in the state based on the regret value of the action.

15. The non-transitory, computer-readable medium of claim 11, wherein the state corresponds to a public sequence that comprises one or more actions publically known by the execution device and one or more other devices; and
the each information set in the vector of information sets comprises the public sequence.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
identifying a plurality of possible actions in a state, wherein the state corresponds to a vector of information sets, and each information set in the vector of information sets comprises a sequence of actions taken by an execution device that leads to the state;
identifying a vector of current action selection policies in the state, wherein each current action selection policy in the vector of current action selection policies corresponds to an information set in the vector of information sets, and an action selection policy specifies a respective probability of selecting an action among the plurality of possible actions in the state;
computing a sampling policy based on the vector of current action selection policies in the state, wherein the sampling policy specifies a respective sampling probability corresponding to each of the plurality of possible actions in the state;
sampling an action among the plurality of possible actions in the state according to a sampling probability of the action specified in the sampling policy; and updating the each current action selection policy in the vector of current action selection policies of the execution device in the state based on the action.

17. The computer-implemented system of claim 16, further comprising, in response to determining that a convergence condition is met, controlling operations of the execution device based on the action selection policy.

18. The computer-implemented system of claim 16, wherein updating the each current action selection policy in the vector of current action selection policies of the execution device in the state based on the action comprises performing Monte Carlo counterfactual regret minimization (MCCFR) based on the action.

19. The computer-implemented system of claim 16, wherein updating the each current action selection policy in the vector of current action selection policies of the execution device in the state based on the action comprises:

calculating a probability of a sampled terminal sequence of actions based on the sampling probability of the action, the sampled terminal sequence of actions including the action and a terminal state for completing a task;

calculating a sampled counterfactual value of the action based on the probability of the sampled terminal sequence of actions;

calculating a regret value of the action based on the sampled counterfactual value of the action; and updating the each of the vector of current action selection policies of the execution device in the state based on the regret value of the action.

20. The computer-implemented system of claim 16, wherein the state corresponds to a public sequence that comprises one or more actions publically known by the execution device and one or more other devices; and the each information set in the vector of information sets comprises the public sequence.

* * * * *